US 8,526,555 B2

(12) United States Patent
Nagata et al.

(10) Patent No.: US 8,526,555 B2
(45) Date of Patent: *Sep. 3, 2013

(54) USER APPARATUS AND CELL SEARCH METHOD

(75) Inventors: Satoshi Nagata, Yokosuka (JP);
Yoshihisa Kishiyama, Yokosuka (JP);
Motohiro Tanno, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 227 days.

This patent is subject to a terminal disclaimer.

(21) Appl. No.: 13/058,550

(22) PCT Filed: Aug. 7, 2009

(86) PCT No.: PCT/JP2009/063990
§ 371 (c)(1),
(2), (4) Date: Apr. 26, 2011

(87) PCT Pub. No.: WO2010/018785
PCT Pub. Date: Feb. 18, 2010

(65) Prior Publication Data
US 2011/0188558 A1 Aug. 4, 2011

(30) Foreign Application Priority Data
Aug. 11, 2008 (JP) ................................. 2008-207485

(51) Int. Cl.
*H04L 7/00* (2006.01)
(52) U.S. Cl.
USPC ........................... 375/354; 370/328; 370/350

(58) Field of Classification Search
USPC ................ 375/142, 145, 149–150, 354, 365, 375/368, 377, 224, 316, 342, 340; 370/350, 370/328, 338, 503, 507, 509, 510, 513, 514
See application file for complete search history.

(56) References Cited

U.S. PATENT DOCUMENTS

| 6,606,341 | B1* | 8/2003 | Kanterakis et al. | 375/130 |
| 7,532,590 | B2* | 5/2009 | Ok et al. | 370/310 |
| 7,580,428 | B1* | 8/2009 | Nassiri-Toussi et al. | 370/503 |
| 2012/0122446 | A1* | 5/2012 | Malladi et al. | 455/422.1 |

FOREIGN PATENT DOCUMENTS

| JP | 2001-145151 A | 5/2001 |
| JP | 2006-507753 A | 3/2006 |
| JP | 2008-118309 A | 5/2008 |
| WO | 2004/049618 A1 | 6/2004 |
| WO | 2008/042874 A2 | 4/2008 |

OTHER PUBLICATIONS

International Search Report w/translation from PCT/JP2009/063990 dated Sep. 1, 2009 (4 pages).

(Continued)

*Primary Examiner* — Jean B Corrielus
(74) *Attorney, Agent, or Firm* — Osha Liang LLP

(57) ABSTRACT

A user apparatus for performing cell search includes: a timing information detection unit configured to detect timing information of a synchronization signal transmitted from a connected base station; a secondary synchronization channel correlation detection unit configured to detect a correlation of a secondary synchronization channel included in a synchronization signal transmitted by other base station other than the connected base station by using the timing information detected by the timing information detection unit; and a secondary synchronization channel detection unit configured to detect the secondary synchronization channel based on a result of the correlation detection by the secondary synchronization channel correlation detection unit.

11 Claims, 13 Drawing Sheets

(56) References Cited

OTHER PUBLICATIONS

3GPP TSG RAN WG1 Meeting #46bis, R1-062723; "Neighboring Cell Search Without Using SCH for E-UTRA"; NTT Docomo et al.; Seoul, Korea; Oct. 9-13, 2006 (2 pages).

3GPP TR25.814 V7.0.0; "3rd Generation Partnership Project; Technical Specification Group Radio Access Network; Physical layer aspects for evolved Universal Terrestrial Radio Access (UTRA)"; Jun. 2006 (126 pages).

3GPP TS 36.211 V8.2.0; "3rd Generation Partnership Project; Technical Specification Group Radio Access Network; Evolved Universal Terrestrial Radio Access (E-UTRA); Physical Channels and Modulation"; Mar. 2008 (65 pages).

3GPP TSG-RAN WG1 #47-bis, R1-070428; "Further analysis of initial cell search for Approach 1 and 2—single cell scenario"; Qualcomm Europe; Sorrento, Italy; Jan. 15-19, 2007 (10 pages).

C. Chu; "Polyphase Codes With Good Periodic Correlation Properties"; IEEE Trans. Inform. Theory; vol. 11-18, pp. 531-532; Jul. 1972 (2 pages).

R. L. Frank et al.; "Phase Shift Pulse Codes With Good Periodic Correlation Properties"; IRE Trans. Inform. Theory; vol. IT-8, No. 6; pp. 381-382; Oct. 1962 (4 pages).

M.J.E. Golay; "Complementary Series"; IRE Trans. Inform. Theory; vol. 7, pp. 82-87; Apr. 1961 (3 pages).

3GPP TSG RAN WG1 #46bis; R1-062487; "Hierarchical SCH signals suitable for both (FDD and TDD) modes of E-UTRA"; Huawei; Seoul, Korea; Oct. 9-13, 2006 (4 pages).

3GPP TSG RAN WG1 Meeting #47bis, R1-070146; "S-SCH Sequence Design"; Motorola; Sorrento, Italy; Jan. 15-19, 2007 (5 pages).

Translation of Written Opinion from PCT/JP20091063990 dated Sep. 01, 2009 (4 pages).

* cited by examiner

USER APPARATUS AND CELL SEARCH METHOD

TECHNICAL FIELD

The present invention relates to a radio communication system where OFDM (Orthogonal Frequency Division Multiplexing) is applied in downlink, and particularly relates to a user apparatus and a cell search method.

BACKGROUND ART

A successor communication scheme to W-CDMA (Wideband Code Division Multiple Access) and HSPA (High Speed Packet Access), that is, Evolved UTRA and UTRAN (also referred to as LTE (Long Term Evolution) or Super 3G) is being discussed in W-CDMA standardization group 3GPP ($3^{rd}$ Generation Partnership Project). In the E-UTRA, for example, OFDMA (Orthogonal Frequency Division Multiple Access) and SC-FDMA (Single-Carrier Frequency Division Multiple Access) are utilized for downlink and uplink, respectively. (See non-patent document 1, for example.)

The OFDMA is a transmission scheme where a frequency band is divided into multiple narrower frequency bands (sub-carriers) and data is transmitted in the individual subcarriers. The OFDMA achieves fast transmission by arranging the subcarriers in the frequency band densely while partially overlapping the subcarriers without interfering with each other, resulting in higher frequency utilization efficiency.

The SC-FDMA is a transmission scheme where a frequency band is divided and the different frequency bands are utilized for multiple terminals for reduction in interference among the terminals. Since the SC-FDMA has characteristics of reduced variations of transmission power, it can reduce power consumption in the terminals and realize broader coverage.

In the LTE, two types of CPs (Cyclic Prefixes) having different lengths, a long CP and a short CP, are provided for reducing influence of inter-symbol interference due to delayed waves. For example, the long CP may be for a cell having a large cell radius and be applied in transmission of MBMS (Multimedia Broadcast Multicast Service) signals, and the short CP is applied for a cell having a smaller cell radius. In the long CP applied case, six OFDM symbols are provided in one slot, and in the short CP applied case, seven OFDM symbols are provided in one slot.

Meanwhile, in a radio communication system using the W-CDMA, the LTE and so on, a mobile station must generally detect a cell having higher radio quality for itself based on a synchronization signal or others at power, up, in standby period, during communication, at discontinuous reception in communication or at other timings. This process is called cell search in a sense that the mobile station searches for the cell to be connected to establish a radio link. In general, a cell search method is selected based on an amount of time required for the cell search and an amount of load of the mobile station for the cell search. In other words, the cell search method may be selected to achieve the cell search in a shorter time period at a smaller amount of processing load of the mobile station.

In the W-CDMA, the cell search uses two types of synchronization signals, a primary SCH (P-SCH) and a secondary SCH (S-SCH). Also in the LTE, the two types of synchronization signals P-SCH and S-SCH are used in the cell search.

In one cell search method, for example, the P-SCH having one sequence and the S-SCH having multiple sequences may be transmitted every 5 ms (non-patent document 2). In this cell search method, downlink reception timings from cells are identified based on the P-SCH, and frame reception timing and cell specific information such as a cell ID or a cell group ID are identified based on the S-SCH transmitted in the same slot. Here, a channel estimation value derived from the P-SCH can be generally used in demodulation and decoding of the S-SCH. Also, if the cell IDs are grouped, a relevant cell ID is detected among the cell IDs belonging to a detected cell group ID. For example, the cell ID may be calculated based on a signal pattern of a pilot signal. In another example, the cell ID may be calculated based on demodulation and decoding of the P-SCH. Alternatively, the cell ID may be included as an information element of the S-SCH without grouping the cell IDs. In this case, a mobile station can detect the cell ID at the S-SCH demodulation and decoding timing.

In the case where the above-mentioned cell search method is applied, however, the S-SCH transmitted from multiple cells in different sequences would be demodulated and decoded based on the channel estimation value derived from the P-SCH transmitted from the multiple cells in the same sequence in an inter-station synchronization system where signals from the individual cells are synchronized. For this reason, there is a problem that transmission characteristics of the S-SCH may be degraded. Here, the transmission characteristics include time required for the cell search. On the other hand, in an inter-station a synchronization system where signals from individual cells are not synchronized, reception timings of the P-SCH sequences transmitted from the multiple cells are different from each other, which may not cause the above-mentioned problem.

In order to prevent the degradation of the S-SCH characteristics in the inter-station synchronization system as stated above, a cell search method using two or more P-SCH sequences, such as a cell search method using three P-SCH sequences, is being discussed (non-patent document 2). Alternatively, in order to prevent the degradation of the S-SCH characteristics in the inter-station synchronization system as stated above, a method for transmitting the P-SCH at different transmission intervals for different cells is proposed (non-patent document 3). According to these methods, the P-SCH having different reception timings from the multiple cells can be used in demodulation and decoding of the S-SCH, which can prevent the degradation of the S-SCH characteristics as stated above.

Meanwhile, from the viewpoint of cell design, it may be preferable that a greater number of P-SCH sequences in non-patent document 2 and more kinds of transmission intervals of P-SCH in non-patent document 3 be used. This is why there is a higher likelihood that the same P-SCH sequence or the same P-SCH transmission interval is used for adjacent cells in the cases of a smaller number of P-SCH sequence and less kinds of P-SCH transmission intervals, which would increase a likelihood that the S-SCH characteristics may be degraded in the inter-station synchronization system.

Also, there is trade-off between the amount of time required for the cell search, that is, transmission characteristics of the cell search, and the processing load of a mobile station for the cell search. Thus, it is desirable that a policy can be selected, through parameter settings or operation methods, between a policy that the transmission characteristics of the cell search is regarded as important and a policy that the processing load of the mobile station for the cell search is regarded as important.

RELATED ART DOCUMENT

Non-Patent Document

Non-patent document 1: 3GPP TR 25.814 (V7.0.0), "Physical Layer Aspects for Evolved UTRA", June 2006

Non-patent document 2: 3GPP TS36.211 (V8.2.0), "Physical channels and modulation", March 2008

Non-patent document 3: R1-070428, Further analysis of initial cell search for Approach 1 and 2-single cell scenario Non-patent document 4: C. Chu, "Polyphase codes with good periodic correlation properties", IEEE Trans. Inform. Theory, vol. 11-18, pp. 531-532, July 1972

Non-patent document 5: R. L. Frank and S. A. Zadoff, "Phase shift pulse codes with good periodic correlation properties", IRE Trans. Inform. Theory, vol. IT-8, pp. 381-382, 1962

Non-patent document 6: M. J. E. Golay, "Complementary Series", IRE Trans. Inform. Theory, vol. 7, pp. 82-87, April 1961

Non-patent document 7: 3GPP R1-062487, Hierarchical SCH signals suitable for both (FDD and TDD) modes of E-UTRA Non-patent document 8: 3GPP R1-070146, S-SCH Sequence Design

SUMMARY OF THE INVENTION

Problem to be Solved by the Invention

As stated above, the synchronization channel (SCH) is a downlink signaling for use in the cell search. It is determined that a hierarchical type of SCH is applied to the synchronization channel (See non-patent document 2, for example). In other words, the SCH consists of two subchannels, a primary synchronization channel (P-SCH) and a secondary synchronization channel (S-SCH).

Among the primary synchronization channel and the secondary synchronization channel, in the secondary synchronization channel, cell specific information such as a cell ID group, a radio frame timing and transmission antenna quantity information is transmitted. A user apparatus detects the cell specific information by detecting a sequence of the secondary synchronization channel.

As illustrated in FIGS. 1 and 2, a method for mapping different sequences in the frequency direction is proposed as a mapping method of the secondary synchronization sequence (see non-patent document 2, for example). For example, as illustrated in FIG. 1, a non-orthogonal sequence 1 ($P_1(0), P_1(1), \ldots, P_1(30)$) and a non-orthogonal sequence 2 ($P_2(0), P_2(1), \ldots, P_2(30)$) may be alternately mapped every one subcarrier. In this manner, the division of the sequences can increase the number of transmittable patterns. Specifically, if a single type of sequence of sequence length of 62 is used, for example, 62 types of patterns could be transmitted. On the other hand, if two types of sequences having the sequence length of 31 are used as illustrated in FIG. 1, 961 types of patterns could be transmitted.

Until now, it has been established that several types of Zadoff-Chu sequences, such as three types of Zadoff-Chu sequences, are used for the P-SCH and that two types of M sequences are combined for the S-SCH (see non-patent document 2, for example).

Also the P-SCH and the S-SCH are transmitted in the same subframe of 1 ms, and the subframe including the P-SCH and the S-SCH occurs every 5 ms. In other words, the synchronization channels are transmitted every 5 ms. A user apparatus performs the cell search by receiving different P-SCHs for different sectors to calculate a channel estimation value for a residing sector, performing channel compensation of different S-SCHs for different cells based on the channel estimation value and demodulating the S-SCHs. In this application, if there is no risk of confusion, the terms "cell" and "sector" are equivalently used, but, the term "cell" may include multiple "sectors" as needed. In an inter-station synchronization system where signals from cells are synchronized, a mobile station receives the signals from the cells simultaneously.

Here, an example of cell search in a radio communication system is described with reference to FIG. 3.

The mobile station performs correlation detection between the P-SCH sequence and the received signal to detect carrier frequency and timing of the P-SCH (S302, S304). For example, correlation detection is performed in the time domain between the received multicarrier signal and a replica of P-SCH including three different sequences. As a result, P-SCH sequence numbers are detected (step S306).

After the symbol timing, the carrier frequency and the P-SCH sequence number of P-SCH are detected, reception timing and the carrier frequency of S-SCH can be detected. Descramble is performed on the S-SCH multiplied by the scramble sequence.

Next, radio frame timing is detected from the cell specific S-SCH sequence for use in the S-SCH (step S308). For example, since multiple SCHs are placed in one radio frame (two, for example), it is necessary to detect frame timing after detecting the timing. Also, the cell ID group is detected from the cell specific S-SCH sequence (step S310).

Next, the cell ID is detected by using the cell ID group and the P-SCH sequence number (step S312).

Next, in the cell search, the mobile station performs verification (checking process) after detecting the cell specific information such as a cell ID and a radio frame timing (step S314).

In the verification, it is determined whether detection results are correct. If the verification is not successful, detection miss and false detection may arise. If it is determined in the verification that the detection result is correct, the mobile station performs the above-mentioned operations. On the other hand, if it is not determined in the verification that the detection result is correct, the mobile station retries the above-mentioned operations from an operation for identifying the downlink reception timing from the cells based on the P-SCH.

Meanwhile, in Evolved UTRA, inter-cell synchronization operation can be performed in addition to inter-cell asynchronous operation. When the inter-cell synchronization operation is performed, SCH is transmitted from multiple cells in the same timing. Therefore, the P-SCH is also transmitted from multiple cells in the same timing. In such a case, especially in neighboring cell search, it is not preferable to perform the cell search from the first stage from the viewpoint of reduce cell search time.

Accordingly, one object of the present invention is to provide a user apparatus and a cell search method that can reduce the time required for the cell search when inter-cell synchronization is performed.

Means for Solving the Problem

For solving the problem, the present user apparatus is a user apparatus for performing cell search, including:

a timing information detection unit configured to detect timing information of a synchronization signal transmitted from a connected base station;

a secondary synchronization channel correlation detection unit configured to detect a correlation of a secondary synchronization channel included in a synchronization signal transmitted by other base station other than the connected base station by using the timing information detected by the timing information detection unit; and a secondary synchronization channel detection unit configured to detect the secondary synchronization channel based on a result of the correlation detection by the secondary synchronization channel correlation detection unit.

The present cell search method is a cell search method in a user apparatus for performing cell search, including:

a timing information detection step of detecting timing information of a synchronization signal transmitted from a connected base station;

a secondary synchronization channel correlation detection step of detecting a correlation of a secondary synchronization channel included in a synchronization signal transmitted from other base station other than the connected base station by using the timing information detected in the timing information detection step; and a secondary synchronization channel detection step of detecting the secondary synchronization channel based on a result of the correlation detection in the secondary synchronization channel correlation detection step.

Effect of the Present Invention

According to an embodiment of the present invention, a user apparatus and a cell search method that can reduce the time required for the cell search when inter-cell synchronization is performed can be realized.

EMBODIMENTS FOR CARRYING OUT THE INVENTION

Embodiments of the present invention are described below with reference to the drawings. In all the drawings illustrating the embodiments, the same reference symbols are attached to those having the same functions, and descriptions thereof are not repeated.

First Embodiment

System

Figure 1:
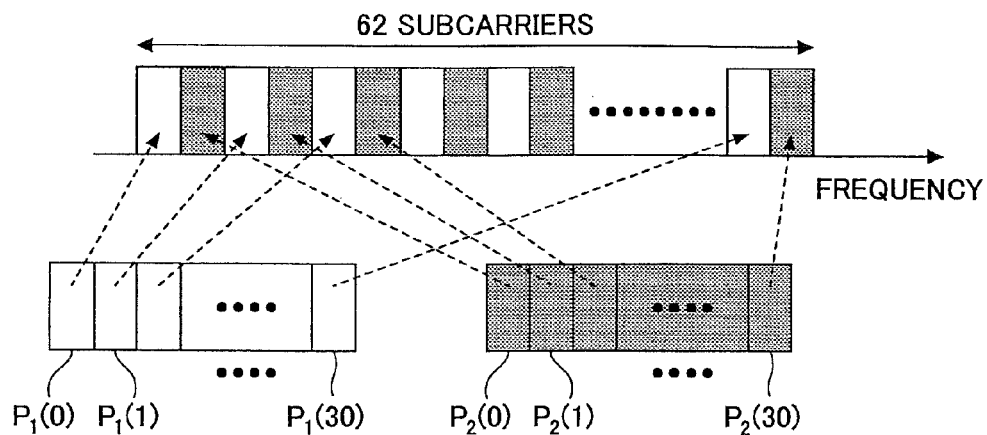
FIG. 1 is a schematic diagram illustrating a S-SCH sequence mapping method.
Figure 2:
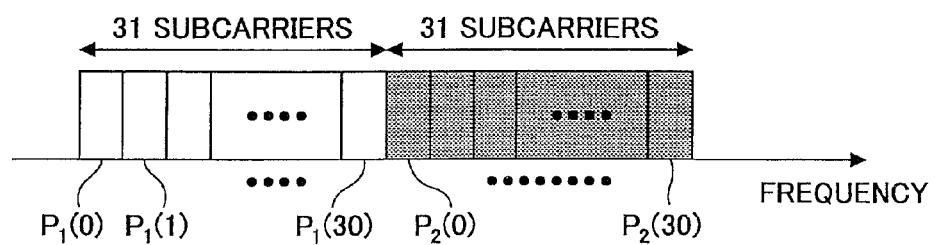
FIG. 2 is a schematic diagram illustrating a S-SCH sequence mapping method.
Figure 3:
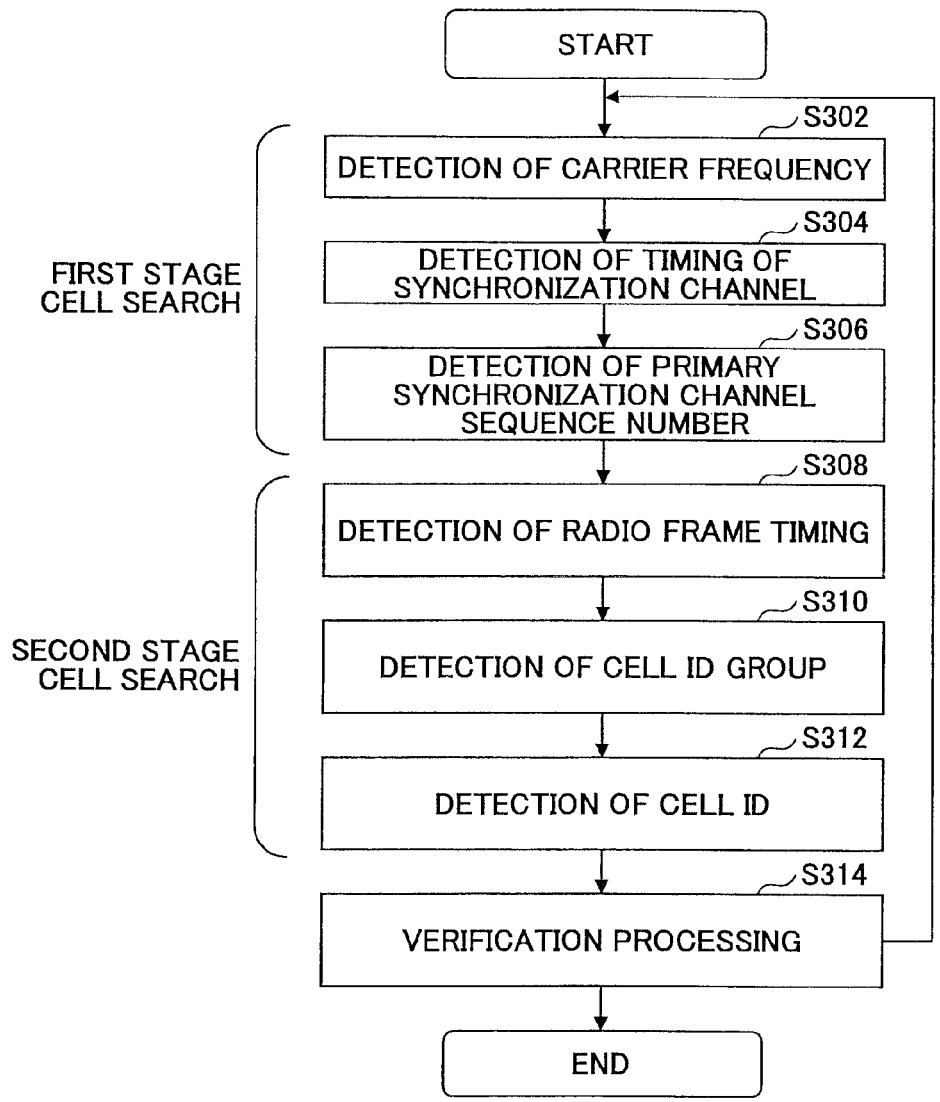
FIG. 3 is a flow diagram showing an example of cell search.
Figure 4:
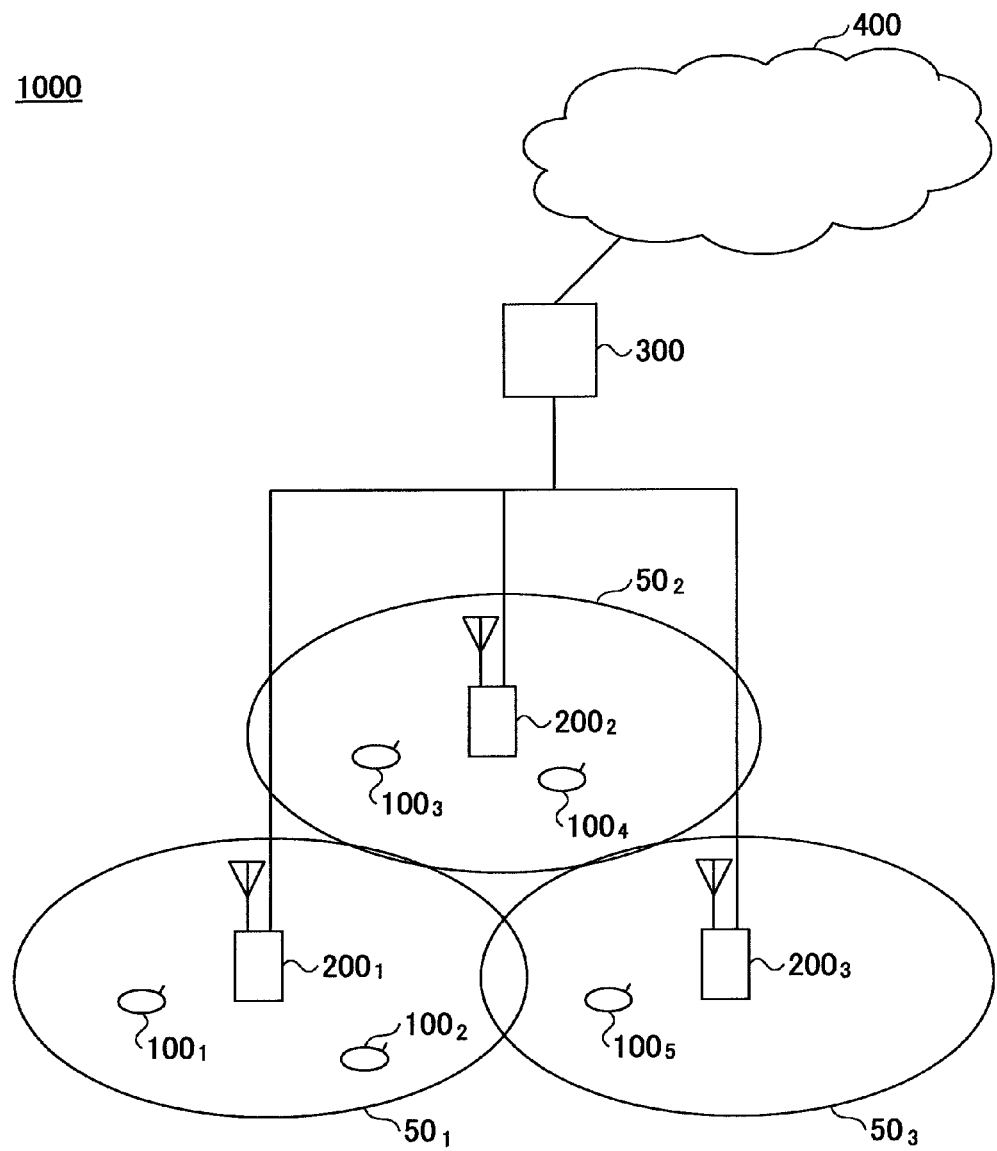
FIG. 4 is a schematic diagram illustrating a radio communication system according to an embodiment.

A radio communication system having mobile stations and base station apparatuses according to the present embodiment is described with reference to FIG. 4.

A radio communication system 1000 is an Evolved UTRA and UTRAN (also referred to as Long Term Evolution or Super 3G) applied system, for example. The radio communication system 1000 includes base station apparatuses (eNB: eNode B) $200_m$ ($200_1$, $200_2$, $200_3$, ..., $200_m$ where m is a positive integer) and mobile stations $100_n$ ($100_1$, $100_2$, $100_3$, ..., $100_n$ where n is a positive integer) communicating with the base stations $200_m$. For the sake of convenience of explanation, although the mobile station communicates with the base station apparatus by radio, the mobile station may be a user apparatus (UE: User Equipment) including a mobile terminal and a fixed terminal more generally. The base station 200 is connected to an upper station such as an access gateway apparatus 300, which is in turn connected to a core network 400. The access gateway apparatus 300 may be called MME/SGW (Mobility Management Entity/Serving gateway).

The mobile station $100_n$ communicates with the base station apparatus $200_m$ in any of cells $50_k$ ($50_1$, $50_2$, ..., $50_k$ where k is a positive integer) in accordance with Evolved UTRA and UTRAN.

Here, it is assumed that some of the mobile stations $100_n$ are in communication through a communication channel established with any of the base station apparatuses $200_m$ while others are not in communication without any communication channel established with any of the base station apparatuses $200_m$.

The base station apparatus $200_m$ transmits a synchronization signal. In the present embodiment, synchronization operation is performed between base stations. Therefore, the base station apparatuses $200_1$, $200_2$ and $200_3$ transmit SCH at the same timing. For example, the base station apparatuses $200_1$, $200_2$ and $200_3$ may transmit a MEMS signal.

The mobile station $100_n$ resides in any of the cells $50_k$ ($50_1$, $50_2$, ..., $50_k$ where k is a positive integer) and performs the cell search for detecting a cell providing the mobile station with higher radio quality based on the synchronization signal at power up timing, at discontinuous reception timing during communication or other timings. Specifically, the mobile station $100_n$ uses the synchronization signal to detect a symbol timing and a frame timing as well as cell specific information such as a cell ID (cell specific scramble code generated from the cell ID) or a collection of cell IDs (referred to as a cell ID group hereinafter).

Here, the cell search is conducted in both cases where the mobile station $100_n$ is in communication and the mobile station $100_n$ is not in communication. For example, the cell search for mobile stations being in communication may include a cell search for detecting a cell having the same frequency and a cell search for detecting a cell having a different frequency. Also, the cell search for mobile stations not being in communication may include a cell search at power up and a cell search during standby.

Since the base station apparatuses $200_m$ ($200_1$, $200_2$, $200_3$, ..., $200_m$) have the same arrangement, function and state, the base station apparatus $200_m$ is described below unless specifically stated otherwise. Since the mobile stations $100_n$ ($100_1$, $100_2$, $100_3$, ..., $100_n$) have the same arrangement, function and state, the mobile stations $100_n$ is described below unless specifically stated otherwise. Since the cells $50_k$ ($50_1, 50_2, \ldots, 50_k$) have the same arrangement, function and state, the cell $50_k$ is described below unless specifically stated otherwise.

In the radio communication system 1000, the OFDMA and the SC-FDMA are applied as radio access schemes to downlink and uplink, respectively. As stated above, the OFDMA is a transmission scheme where a frequency band is divided into multiple narrower frequency bands (subcarriers) and data is transmitted in the individual frequency bands. The SC-FDMA is a transmission scheme where a frequency band is divided and the divided different frequency bands are used among different terminals, resulting in reduction in inter-terminal interference.

Communication channels in the Evolved UTRA and UTRAN are described below.

For downlink, a PDSCH (Physical Downlink Shared Channel) shared among the mobile stations $100_n$ and a LTE downlink control channel are used. In downlink, the LTE downlink control channel is used to transmit information on mobile stations mapped to the PDSCH and associated transport format information, information on mobile station mapped to a physical uplink shared channel and associated transport format information, acknowledgement information on the physical uplink shared channel and so on. The PDSCH is used to transmit user data.

Also, the base station apparatus $200_m$ transmits a synchronization signal in downlink so that the mobile station $100_n$ can perform cell search.

For uplink, a PUSCH (Physical Uplink Shared Channel) shared among the mobile stations 100, and a LTE uplink control channel are used. The uplink control channel includes two types of channels, that is, a channel time-multiplexed with the PUSCH and a channel frequency-multiplexed with the PUSCH.

In uplink, the LTE uplink control channel is used to transmit a downlink CQI (Channel Quality Indicator) for use in scheduling and AMC (Adaptive Modulation and Coding) for the PDSCH and acknowledgement information (HARQ ACK information) on the PDSCH. Also, the PUSCH is used to transmit user data.

Figure 5:
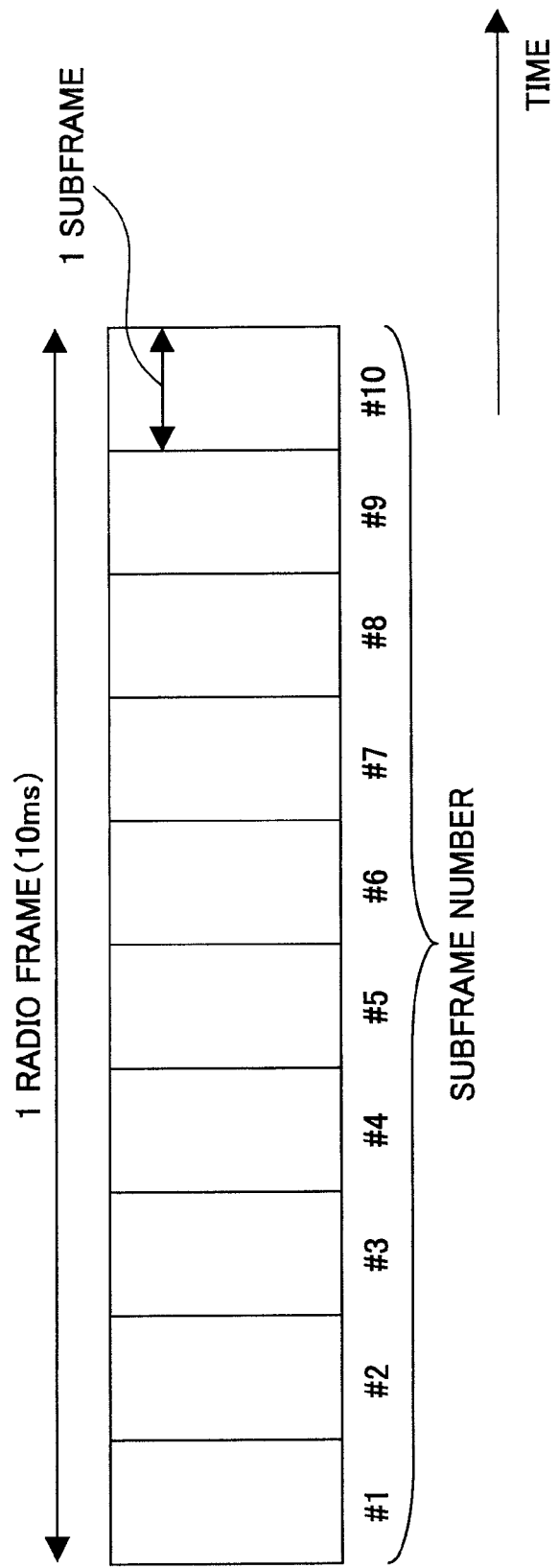
FIG. 5 is a schematic diagram illustrating an arrangement of a radio frame.
Figure 6:
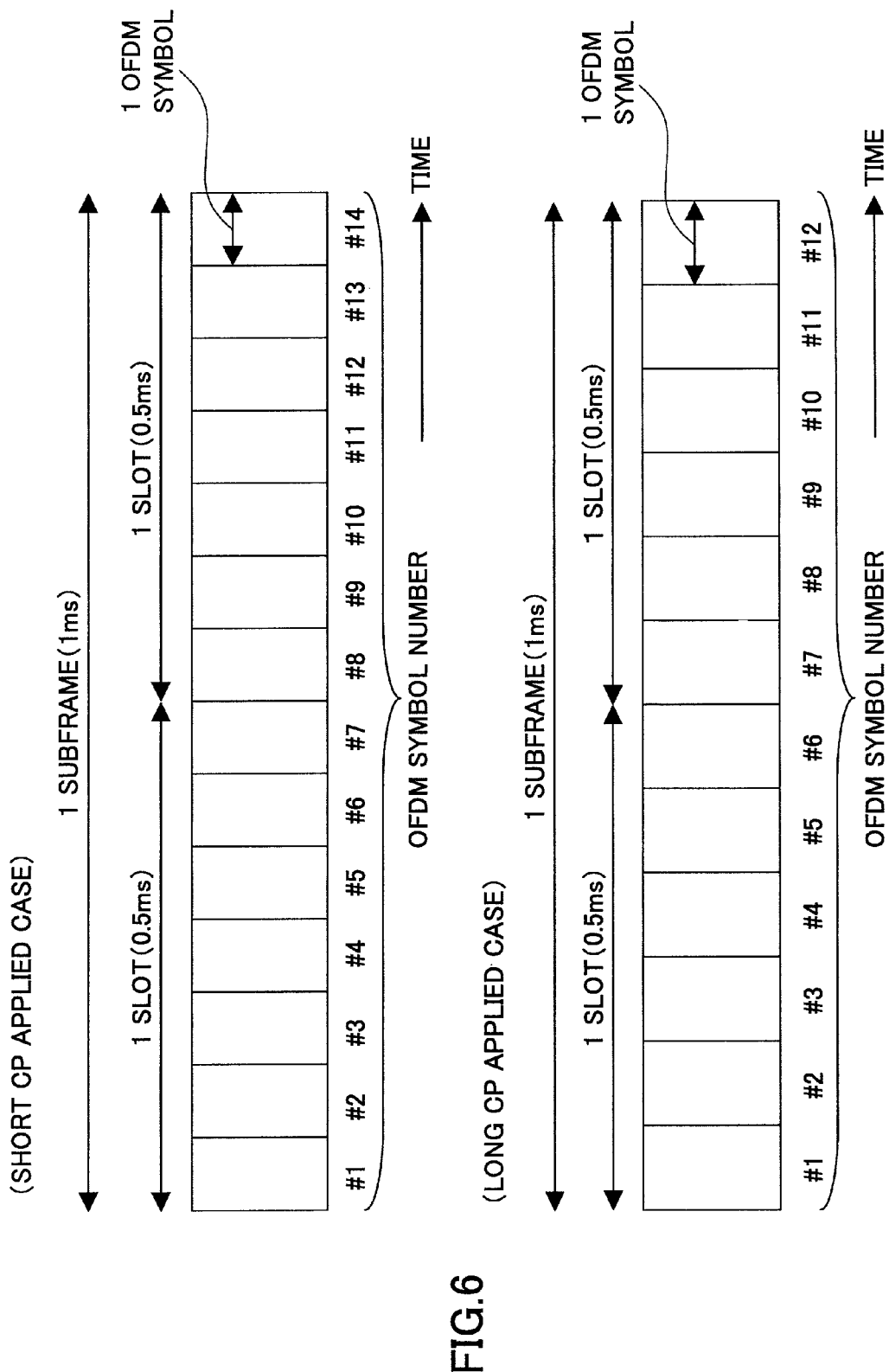
FIG. 6 is a schematic diagram illustrating an arrangement of a subframe.

As illustrated in FIG. 5, one radio frame has 10 ms and includes 10 subframes in downlink. Also, as illustrated in FIG. 6, one subframe consists of two slots. If a short CP is used, the single slot consists of seven OFDM symbols (upper portion in FIG. 6), and if a long CP is used, the single slot consists of six OFDM symbols (lower portion in FIG. 6).

<Base Station Apparatus eNB>

Figure 7:
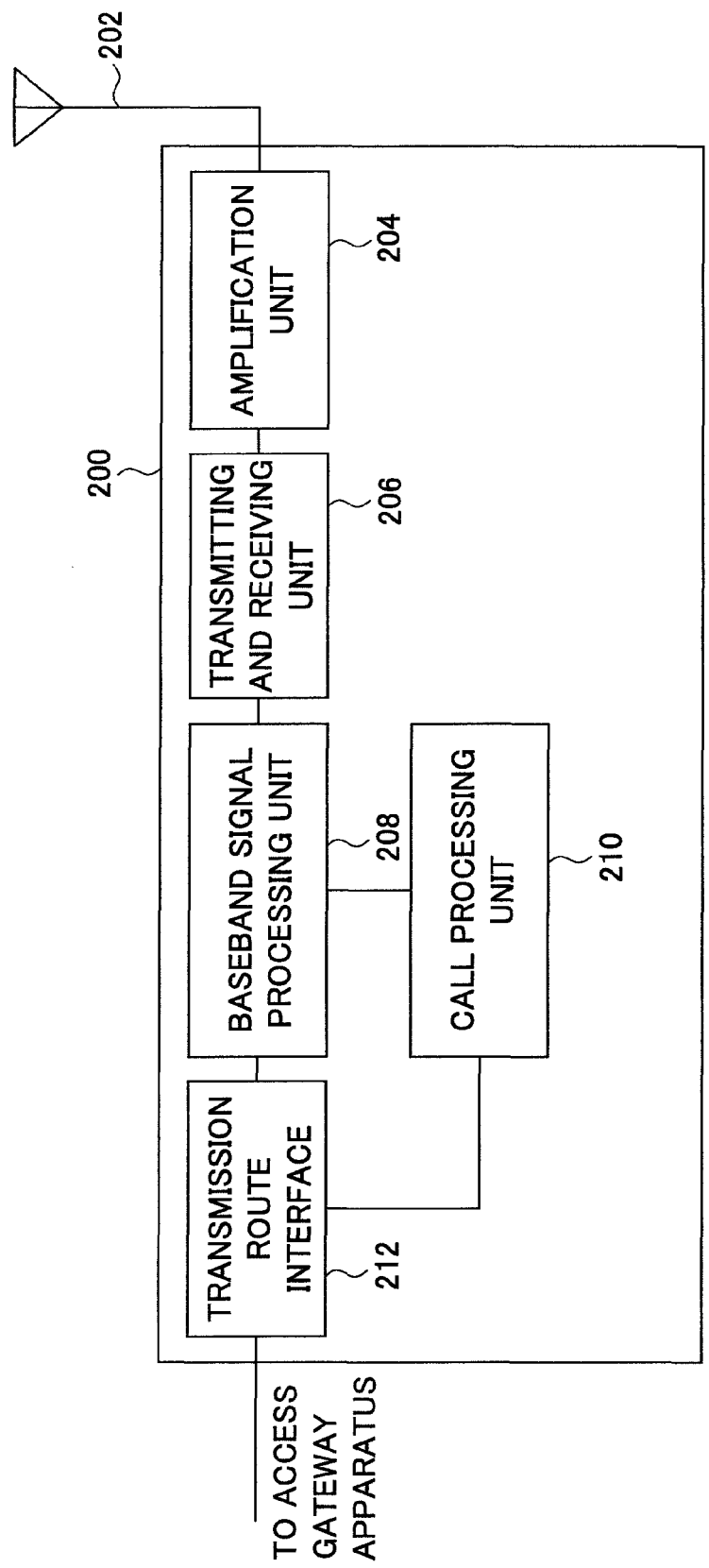
FIG. 7 is a partial block diagram illustrating a base station apparatus according to an embodiment.

The base station apparatus $200_m$ according to the present embodiment is described with reference to FIG. 7.

The base station apparatus 200 according to the present embodiment includes a transmit and receive antenna 202, an amplification unit 204, a transmitting and receiving unit 206, a baseband signal processing unit 208, a call processing unit 210 and a transmission route interface 212.

Packet data transmitted from the base station apparatus $200_m$ to the mobile station $100_n$ in downlink is supplied from a station upper to the base station apparatus $200_m$ such as the access gateway apparatus 300 to the baseband signal processing unit 208 via the transmission route interface 212.

The baseband signal processing unit 208 performs transmission processing in PDCP layer, segmentation and concatenation of packet data, RLC (Radio Link Control) layer transmission operations such as a transmission operation for RLC retransmission control, MAC retransmission control, HARQ (Hybrid Automatic Repeat reQuest) transmission operations, scheduling, transmission format selection and channel coding, and inverse fast Fourier transform (IFFT), and forwards the resulting signal to the transmitting and receiving unit 206. Also, the baseband signal processing unit 208 performs generation processing of a synchronization signal as stated below. The synchronization signal is multiplexed to the packet data, and forwarded to the transmitting and receiving unit 206.

The transmitting and receiving unit 206 performs frequency conversion for converting the baseband signal supplied from the baseband signal processing unit 208 into a radio frequency band, and then the resulting signal is amplified in the amplification unit 204 and transmitted from the transmitting and receiving unit 202. Here, the baseband signal is packet data, a synchronization signal and so on.

On the other hand, for data transmitted from the mobile station $100_n$ to the base station apparatus $200_m$ in uplink, a radio frequency signal received at the transmitting and receiving antenna 202 is amplified in the amplification unit 204 and frequency converted into a baseband signal in the transmitting and receiving unit 206. The resulting baseband signal is supplied to the baseband signal processing unit 208.

The baseband signal processing unit 208 performs a FFT operation, error correction decoding, a reception operation in MAC retransmission control and a RLC layer reception operation on the incoming baseband signal and forwards the resulting signal to the access gateway apparatus 300 via the transmission route interface 212.

The call processing unit 210 performs state management of the base station apparatus 200 and resource assignment.

<Base Band Signal Processing Unit>

Figure 8:
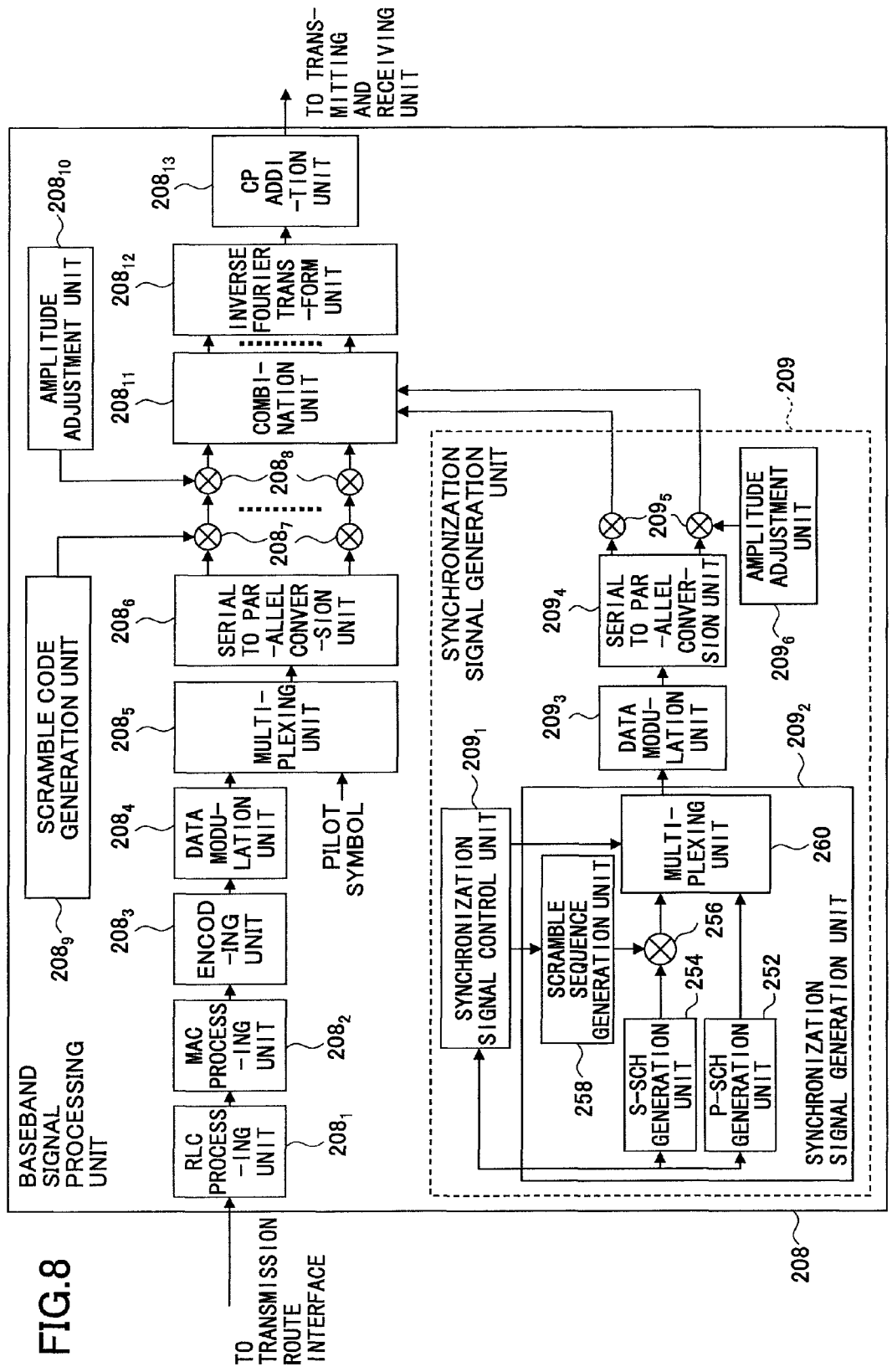
FIG. 8 is a block diagram illustrating a baseband signal processing unit in a base station apparatus according to an embodiment.

Next, an arrangement of the baseband signal processing unit 208 is described with reference to FIG. 8. In FIG. 8, portions related to downlink processing are illustrated, and portions related to uplink processing are omitted.

The baseband signal processing unit 208 includes a RLC processing unit $208_1$, a MAC (Medium Access Control) processing unit $208_2$, an encoding unit $208_3$, a data modulation unit $208_4$, a multiplexing unit $208_5$, a serial to parallel conversion unit $208_6$, multipliers $208_7$, multipliers $208_8$, a scramble code generation unit $208_9$, an amplitude adjustment unit $208_{10}$, a combination unit $208_{11}$, an IFFT (IDFT) $208_{12}$, a CP addition unit $208_{13}$ and a synchronization signal generation unit 209.

The RLC processing unit $208_1$ performs segmentation and concatenation and RLC layer transmission operations such as a transmission operation for RLC retransmission control on a transmission data sequence of downlink packet data received from the transmission route interface 212. The MAC processing unit $208_2$ performs a HARQ transmission operation, scheduling, transmission format selection and a MAC layer transmission operation such as frequency resource assignment on the resulting signal of the RLC processing unit $208_1$. Then, the encoding unit $208_3$ encodes the resulting signal of the MAC processing unit $208_3$, and the data modulation unit $208_4$ performs data modulation. The multiplexing unit $208_5$ multiplexes the data modulated transmission data sequence with pilot symbols. The serial to parallel conversion unit $208_6$ performs serial to parallel conversion on the pilot symbol multiplexed transmission data sequence into N information symbol sequences on a frequency axis for arrangement on the frequency axis. Here, the pilot symbol may be a downlink reference signal (DL-RS), for example. Each of N multipliers $208_7$ multiplies the N information symbol sequences on the frequency axis with scramble codes supplied from the scramble code generation unit $208_9$ in the frequency direction. In addition, each of N multipliers $208_8$ multiplies the scramble code multiplied symbol sequences with an amplitude adjustment sequence value supplied from the amplitude adjustment unit $208_{10}$ to supply to the combination unit $208_{11}$. The combination unit $208_{11}$ multiplexes the symbol sequence having the sequence length N, multiplied by the scramble code and amplitude adjustment sequence value, with a synchronization signal generated in the synchronization signal generation unit 209 in a relevant subcarrier in N subcarriers.

As stated below, a synchronization signal control unit $209_1$ determines the subframe number and the slot number for transmitting the synchronization signal. In the subframe number and the slot number for transmitting the synchronization signal, the combination unit $208_{11}$ combines the synchronization signal generated in the synchronization signal generation unit 209 with other signals (a symbol sequence obtained by multiplying downlink packet data by the scramble code and the amplitude adjustment sequence value). In subframe numbers and slot numbers where the synchronization signal is not transmitted, the synchronization signal generated in the synchronization signal generation unit 209 is not multiplexed. In this case, only the symbol sequence of the sequence length N resulting from multiplication of the downlink packet data with the scramble code and the amplitude adjustment sequence value is supplied to the IFFT unit $208_{12}$. The subcarrier with which the synchronization signal is multiplexed is located in a band including a center of the whole bandwidth. Also, the bandwidth of the subcarrier on which the synchronization signal is multiplexed may be set to 945 kHz, for example.

The IFFT unit $208_{12}$ transforms N symbols into an orthogonal multicarrier signal. The CP addition unit $208_{13}$ inserts a CP in this multicarrier signal for each Fourier directed time. There are two types of CP lengths, a long CP and a short CP, and it is determined which of the CP lengths is used for each cell.

A generation operation of a synchronization signal in the synchronization signal generation unit 209 is described. The synchronization signal includes a first synchronization signal (referred to as a primary synchronization channel or P-SCH hereinafter) and a second synchronization signal (referred to as a secondary synchronization channel or S-SCH hereinafter).

The synchronization signal generation unit 209 includes the synchronization signal control unit $209_1$, a synchronization signal generation unit $209_2$, a data modulation unit $209_3$, a serial to parallel conversion unit $209_4$, multipliers $209_5$ and an amplitude adjustment unit $209_6$.

The synchronization signal generation unit $209_2$ includes a P-SCH generation unit 252, a S-SCH generation unit 254, a multiplier 256, a scramble sequence generation unit 258 and a multiplexing unit 260. The synchronization signal control unit $209_1$ is connected to the P-SCH generation unit 252, the S-SCH generation unit 254, the scramble sequence generation unit 258 and the multiplexing unit 260 in the synchronization signal generation unit $209_2$.

The synchronization signal control unit $209_1$ determines a P-SCH sequence number and a S-SCH sequence number as well as a subframe number and a slot number for transmitting the P-SCH and the S-SCH based on a cell ID or a cell ID group for a cell where the base station apparatus $200_m$ provides communication in the Evolved UTRA and UTRAN. For example, the mobile station may identify the cell based on a pilot signal, that is, a signal pattern of a reference signal (RS), after identifying the cell ID group. In this case, it is presumed that the signal pattern of the reference signal and the cell ID are predefined. Alternatively, the mobile station may identify the cell based on demodulation and decoding of the P-SCH and the S-SCH, for example. In this case, it is presumed that the P-SCH sequence number and the cell ID are predefined. In the P-SCH, different sequences are selected for different sectors, for example. For example, the P-SCH of a cell consisting of three sectors are selected from a set of three distinct sequences.

Then, the synchronization signal control unit $209_1$ indicates the P-SCH sequence number and the S-SCH sequence number to the P-SCH generation unit 252 and the S-SCH generation unit 254, respectively. Also, the synchronization signal control unit $209_1$ indicates the subframe and the slot number for transmitting the P-SCH and the S-SCH as synchronization signal transmission timing information to the multiplexing unit 260.

Figure 9:
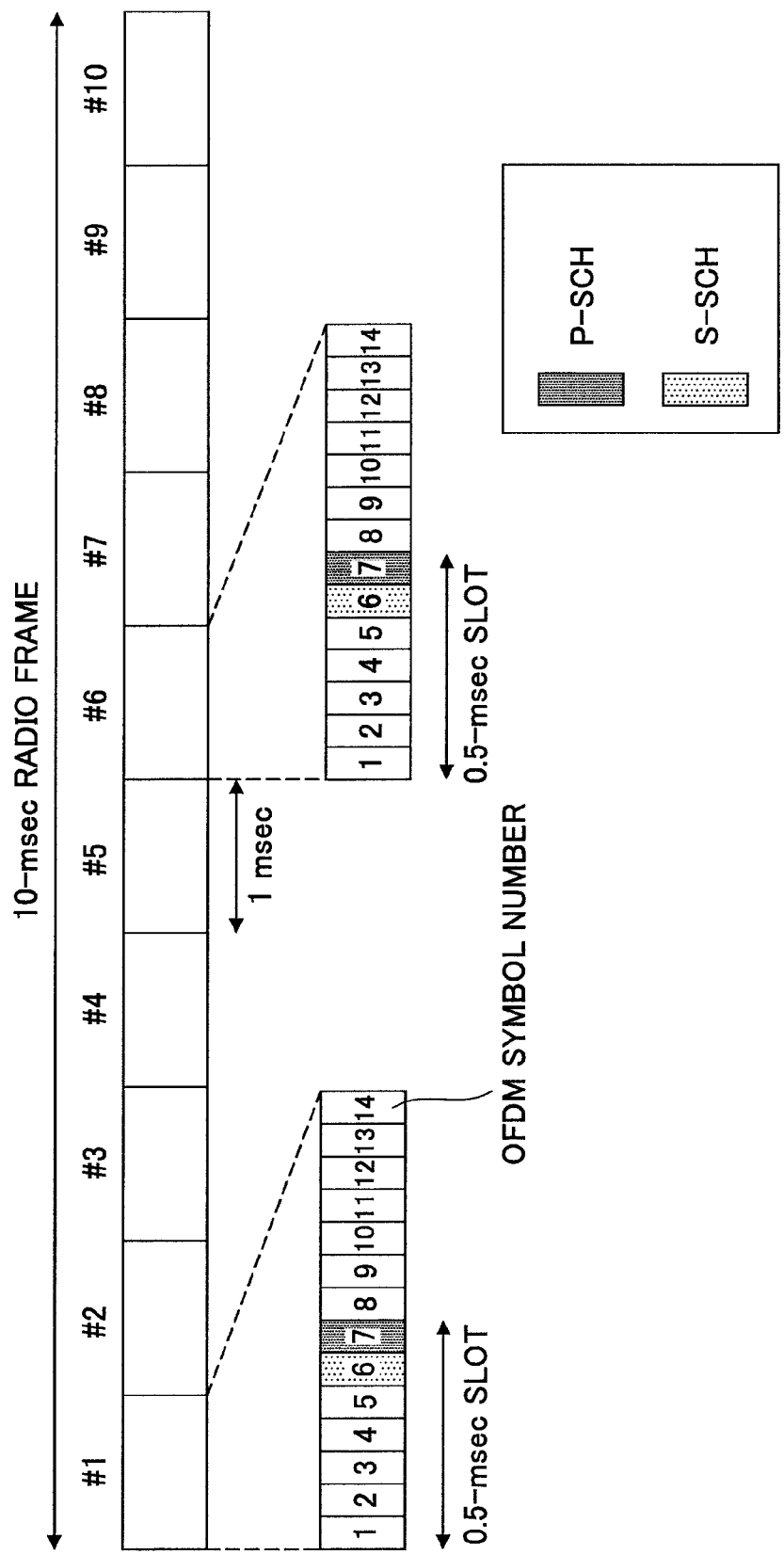
FIG. 9 is a schematic diagram illustrating an exemplary definition of a synchronization signal transmission pattern.

For example, the radio communication system 1000 defines the subframe numbers and the slot numbers for transmitting the P-SCH and the S-SCH, as illustrated in non-patent document 5 and FIG. 9. In this example, several types of P-SCH sequences, for example, three types of P-SCH sequences, are used to transmit the synchronization signal in subframes numbers #1 and #6. Also in this example, the P-SCH is mapped to the last OFDM symbol in the slots, and the mobile station can demodulate the P-SCH in any of the cases of the long CP and the short CP. This is because the sixth OFDM symbol in the case of the long CP temporally corresponds to the seventh OFDM symbol in the case of the short CP in the last OFDM symbol of the slot. In other words, for any of the short CP and the long CP, timings of the slot heads and timings of the slot tails are the same. Then, the radio communication system may associate the P-SCH sequence number with the cell ID information beforehand. If the radio communication system 1000 conducts the association, the synchronization signal control unit $209_1$ in the individual base station apparatuses $200_m$ can determine the P-SCH sequence number based on the cell ID of the cell where the base station apparatus $200_m$ provides communication using the Evolved UTRA and UTRAN.

Generally, a communication area served by the base station apparatus $200_m$ is divided into two or more areas. This is called sectorization. In the case where the base station apparatus $200_m$ has multiple sectors, the cell ID or the cell ID group may be used as an ID for an area including all the sectors of the base station apparatus $200_m$ or as an ID for each of the sectors of the base station apparatus $200_m$. In the case where the cell ID or the cell ID group is used as the ID for the area including all the sectors of the base station apparatus $200_m$, a combination of the synchronization signal sequence with the subframe number and the slot number for transmitting the synchronization signal is set for each of the base station apparatuses $200_m$. In the case where the cell ID or the cell ID group is used as the ID for the individual sectors of the base station apparatus $200_m$, a combination of the synchronization signal sequence with the subframe number and the slot number transmitting the synchronization signal is set for each of the sectors of the base station apparatus $200_m$.

As the P-SCH sequence, a CAZAC (Constant Amplitude Zero AutoCorrelation) sequence such as a Zadoff-Chu sequence (non-patent document 4), a Frank sequence (non-patent document 5), a modulated Frank sequence (non-patent document 5), a Golay complementary sequence (non-patent document 6), a double repetitive Golay complementary sequence (non-patent document 7, a PN (Pseudo Noise) sequence and so on may be used.

Also as the S-SCH sequence, a two-layer type of S-SCH sequence resulting from multiplication of a scramble sequence being an orthogonal sequence or non-orthogonal sequence with an orthogonal sequence or non-orthogonal sequence (non-patent document 8) may be used, a S-SCH sequence resulting from alternate arrangement of several orthogonal sequences or non-orthogonal sequences in a frequency domain may be used, or a S-SCH sequence resulting from multiplication of a scramble sequence being an orthogonal sequence or non-orthogonal sequence with several orthogonal sequences or non-orthogonal sequences (non-patent document 2) may be used. The orthogonal sequence may be a Walsh-Hadamard sequence, a phase rotation orthogonal sequence or an orthogonal M sequence. The non-orthogonal sequence may be a CAZAC sequence such as a GCL sequence, a Golay sequence, a Golay complementary sequence (non-patent document 6), a M sequence (non-patent document 2) and a PN sequence.

<First S-SCH Sequence Determination Method>

The P-SCH generation unit 252 and the S-SCH generation unit 254 generate the P-SCH sequence and the S-SCH sequence, respectively, based on synchronization signal sequence information and synchronization signal transmission timing information indicated by the synchronization signal control unit $209_1$.

For example, the synchronization signal generation unit $209_2$ may make cell specific information, to be reported by S-SCH, layered when generating the S-SCH. The cell specific information includes at least one of a cell ID group, a radio frame timing and transmit antenna quantity information. Here, when a mobile station conducts cell search, the radio communication system 1000 may report a portion of the layered information as prior information such as neighboring cell information. For example, the cell ID group, a portion of the cell ID group, the radio frame timing, the transmit antenna quantity information or a combination of the cell ID group, the portion of the cell ID group, the radio frame timing and the transmit antenna quantity information may be reported as the prior information. In this manner, it is possible to reduce the number of sequences to be detected in the cell search by the mobile station.

Figure 10:
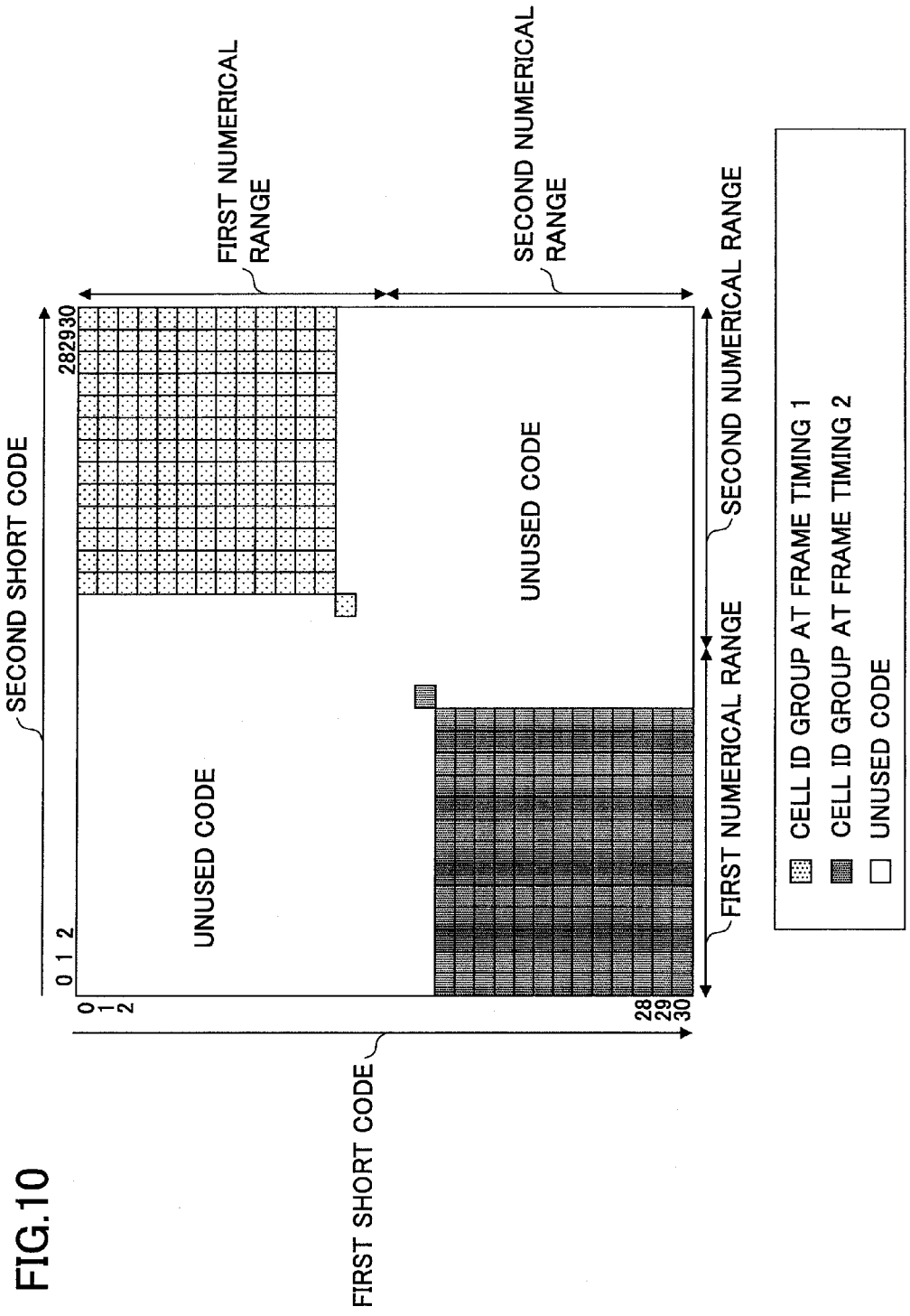
FIG. 10 is a schematic diagram illustrating a S-SCH sequence determination method.

Specifically, as illustrated in FIG. 10, the cell ID groups may be classified into several types of sequences, for example, two types of sequences each including a short code of 31 in sequence length. The first short code in the vertical axis in FIG. 10 represents a sequence index of the first short code in the case where two types of short codes of 31 in sequence length are used in the S-SCH sequence. The second short code in the horizontal axis in FIG. 10 represents a sequence index of the second short code. For any of the short codes, 31 sequence indices are provided, but the number of sequence indices assigned to the first and second short codes may be limited if needed, as stated above.

As illustrated, the sequence index of the first short code for use at (frame) timing #1 is selected from the first numerical range (0-13). The sequence index of the second short code for use at this timing #1 is selected from the second numerical range (23-30). The sequence index of the first short code for use at timing #2 after 5 ms from timing #1 is selected from the second numerical range (23-30). The sequence index of the second short code for use at this timing #2 is selected from the first numerical range (0-13).

In this manner, if the numerical ranges of the sequence indices for use at timings #1 and #2 do not overlap with each other, this is advantageous in quick determination as to whether the detected sequence index of the first short code corresponds to timing #1, in addition to reduction in code candidates in searching for the first and second short codes and faster search.

<Second S-SCH Sequence Determination Method>

Figure 11:
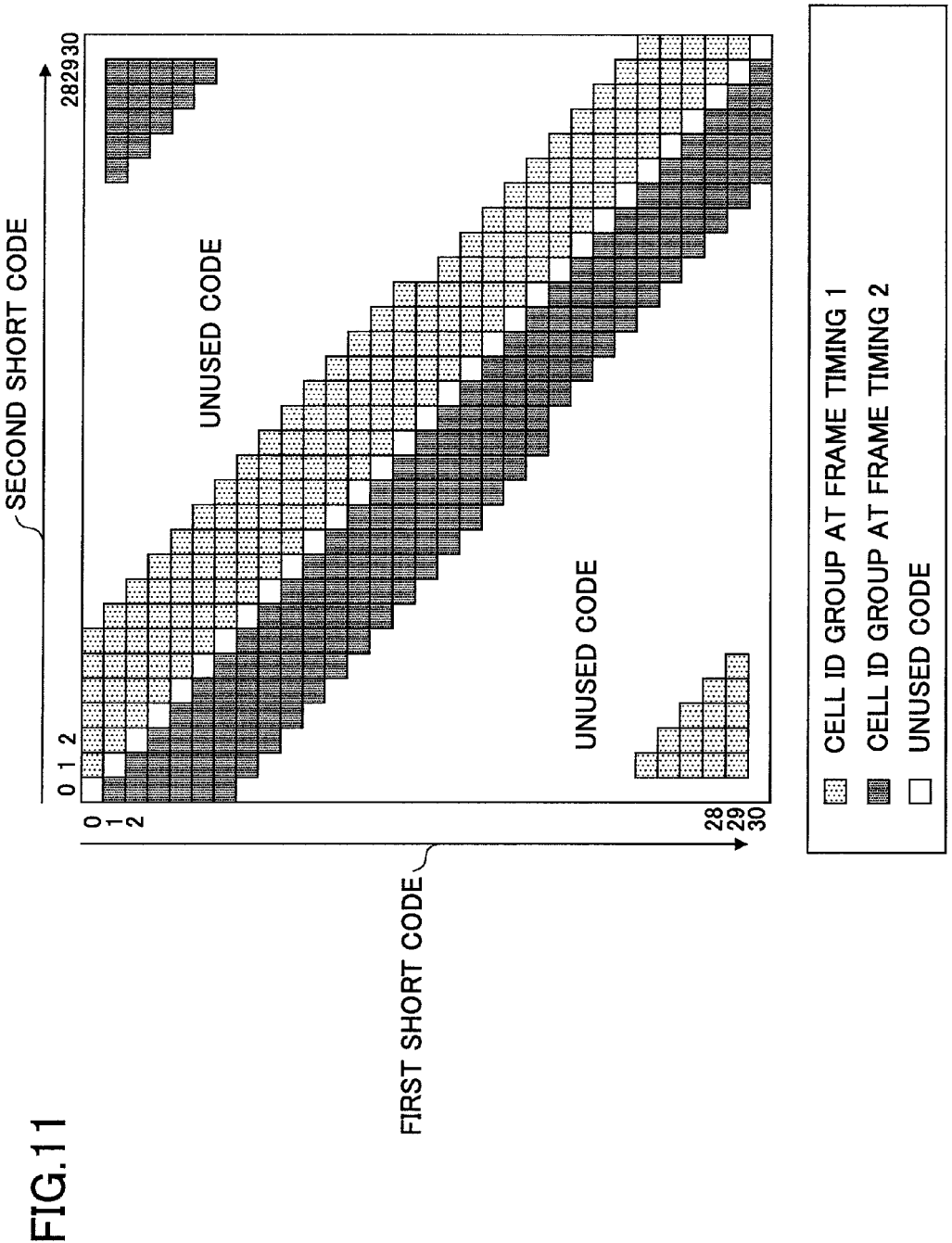
FIG. 11 is a schematic diagram illustrating another S-SCH sequence determination method.

FIG. 11 is a schematic diagram illustrating another S-SCH sequence determination method. In the illustrated example, the sequence indices of the first and second short codes are selected from the same numerical range (0-30). For convenience, it is assumed that the sequence indices of the first and second short codes are m and n, respectively. In the illustrated example, a combination of m and n are selected such that the condition m-n≦Δ or n-m≦Δ is satisfied. The indices m and n are integers in the numerical range (0-30), and Δ is an integer less than or equal to 29. In this method, the sequence indices can be selected from the numerical range broader than that of the case illustrated in FIG. 10, and the freedom of code combinations available for the S-SCH increases, which is preferred to avoid collision.

<Third S-SCH Sequence Determination Method>

Figure 12:
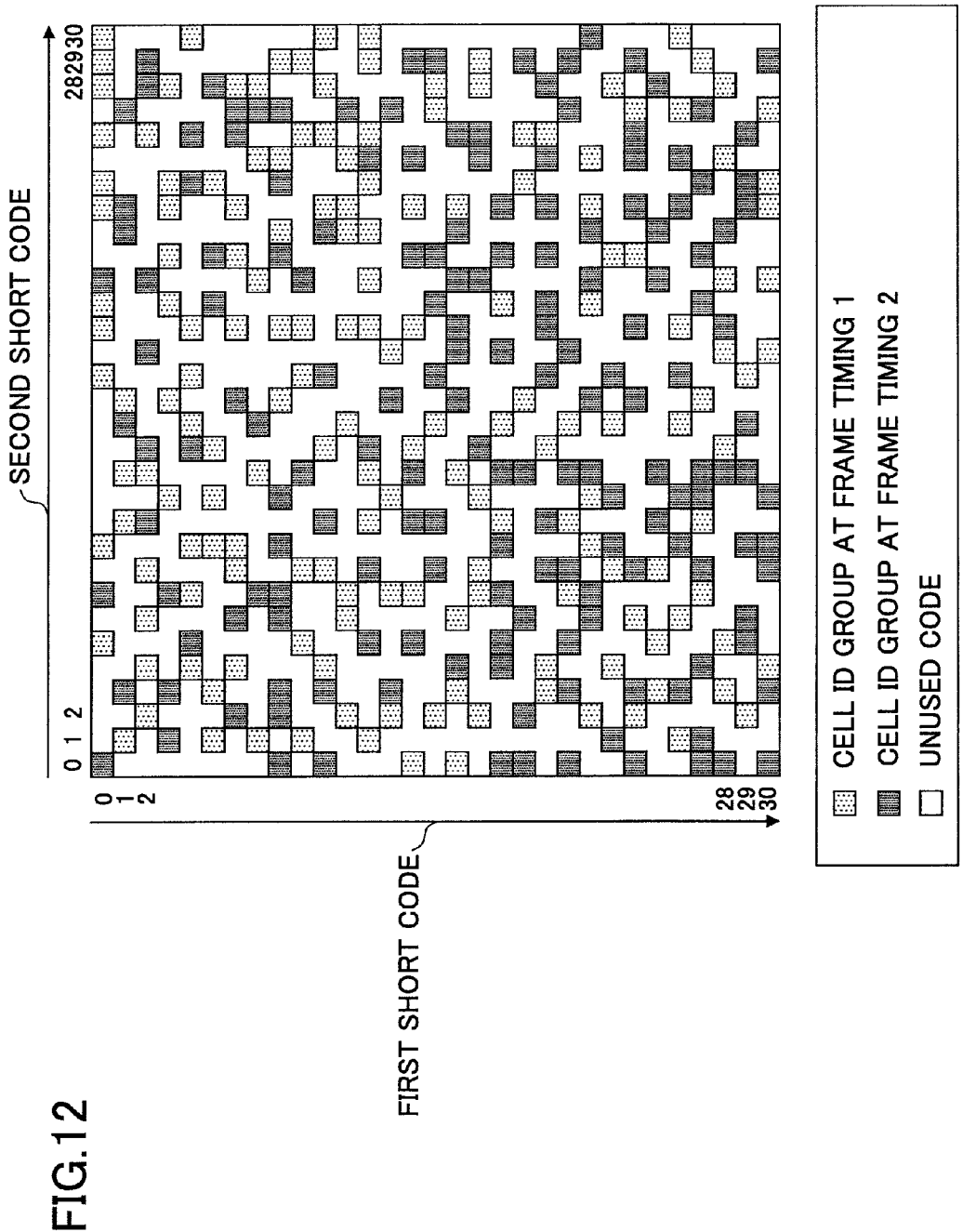
FIG. 12 is a schematic diagram illustrating another S-SCH sequence determination method.

FIG. 12 is a schematic diagram illustrating another S-SCH determination method. Also in the illustrated example, the sequence indices of the first and second short codes are selected from the same numerical range (0-30). However, there is no simple regularity as illustrated in FIGS. 10 and 11, and the first and second short codes are combined in various manners such that the same combination does not occur.

Alternatively, the S-SCH sequence determination method is set as disclosed in non-patent document 2.

The P-SCH sequence generated in the P-SCH generation unit 252 is supplied to the multiplexing unit 260, and the S-SCH sequence generated in the S-SCH generation unit 254 is supplied to the multiplier 256. The synchronization signal control unit $209_1$ supplies information indicative of a scramble sequence to the scramble sequence generation unit 258. For example, the synchronization signal control unit $209_1$ supplies information indicative of a common scramble code over all cells to the scramble sequence generation unit 258. The scramble sequence generation unit 258 generates a scramble sequence based on the information indicative of the scramble sequence supplied from the synchronization signal control unit $209_1$ and supplies the generated scramble sequence to the multiplier 256. In the multiplier 256, the scramble sequence is multiplied with the S-SCH, and the resulting S-SCH sequence is supplied to the multiplexing unit 260. As to the scramble sequence length, the scrambling (spreading) may be conducted over the two types of short codes or for each of the two types of short codes. Multiple types of scramble codes may be used to report system information for the S-SCH sequence such as the radio frame timing, the cell ID group, the transmit antenna quantity information and so on.

In the case where the same S-SCH sequence is used in adjacent cells and/or in cells within the same base station, however, interference from the adjacent cells may degrade the detection likelihood of the S-SCH in a user apparatus. For this reason, a larger amount of time may be required for the cell search, which may lead to degradation of cell search time characteristics. In order to solve the problem through randomization of the interference from the adjacent cells, the synchronization signal control unit $209_1$ preferably provides the scramble sequence generation unit 258 with information indicative of different scramble sequences selected for different cells from multiple types of scramble codes. In this case, different scramble sequences for the different cells, that is, multiple types of scramble sequences, or different scramble sequences for the different base stations may be used as the S-SCH scramble code. In this case, the scramble sequence generation unit 258 generates the scramble sequence based on the information indicative of the scramble sequence supplied from the synchronization signal control unit $209_1$ and supplies the generated scramble sequence to the multiplier 256. Here, the scramble sequence generation unit 258 may generate a scramble sequence specific to the P-SCH sequence corresponding to the P-SCH sequence number.

Also, as disclosed in non-patent document 2, the scramble sequence generation unit 258 may generate a scramble sequence specific to the sequence number for one short code of two types of short codes. In the multiplier 256, the scramble sequence supplied from the scramble sequence generation unit 258 is multiplied with the S-SCH sequence, and the resulting scramble sequence is supplied to the multiplexing unit 260. As to the scramble sequence length, the scrambling may be conducted over the two types of short codes or for each of the two types of short codes. For example, the multiplied scramble sequence may be a scramble sequence specific to all cells, a scramble sequence specific to the P-SCH sequence, multiple types of scramble sequences or a scramble sequence specific to the sequence number for one short code of the two types of short codes. Also, for example, one short code of two types of short codes may be multiplied with a common scramble sequence over all cells, and the other short code may be multiplied with the scramble sequence specific to the P-SCH sequence. Also, for example, one short code of two types of short codes may be multiplied with the scramble sequence specific to the P-SCH sequence, and the other short code may be multiplied with a scramble code specific to the sequence number of the other short code. Multiple types of scramble codes may be used to report system information to the S-SCH sequence such as the radio frame timing, the cell ID group and the transmit antenna quantity information. The multiplexing unit 260 multiplexes the P-SCH sequence with the scramble code multiplied S-SCH sequence and supplies the resulting sequence to the data modulation unit 209₃.

The data modulation unit 209₃ performs data modulation on the synchronization signal sequence generated in the synchronization signal generation unit 209₂, and the serial to parallel conversion unit 209₄ performs serial to parallel conversion on the modulated sequence to generate $N_{SCH}$ symbol sequences on the frequency axis. In the multipliers 209₅, the $N_{SCH}$ symbol signals are multiplied with an amplitude adjustment sequence value supplied from the amplitude adjustment unit 209₆, and the resulting signals are supplied to the combination unit 208₁₁.

<User Apparatus UE>

Figure 13:
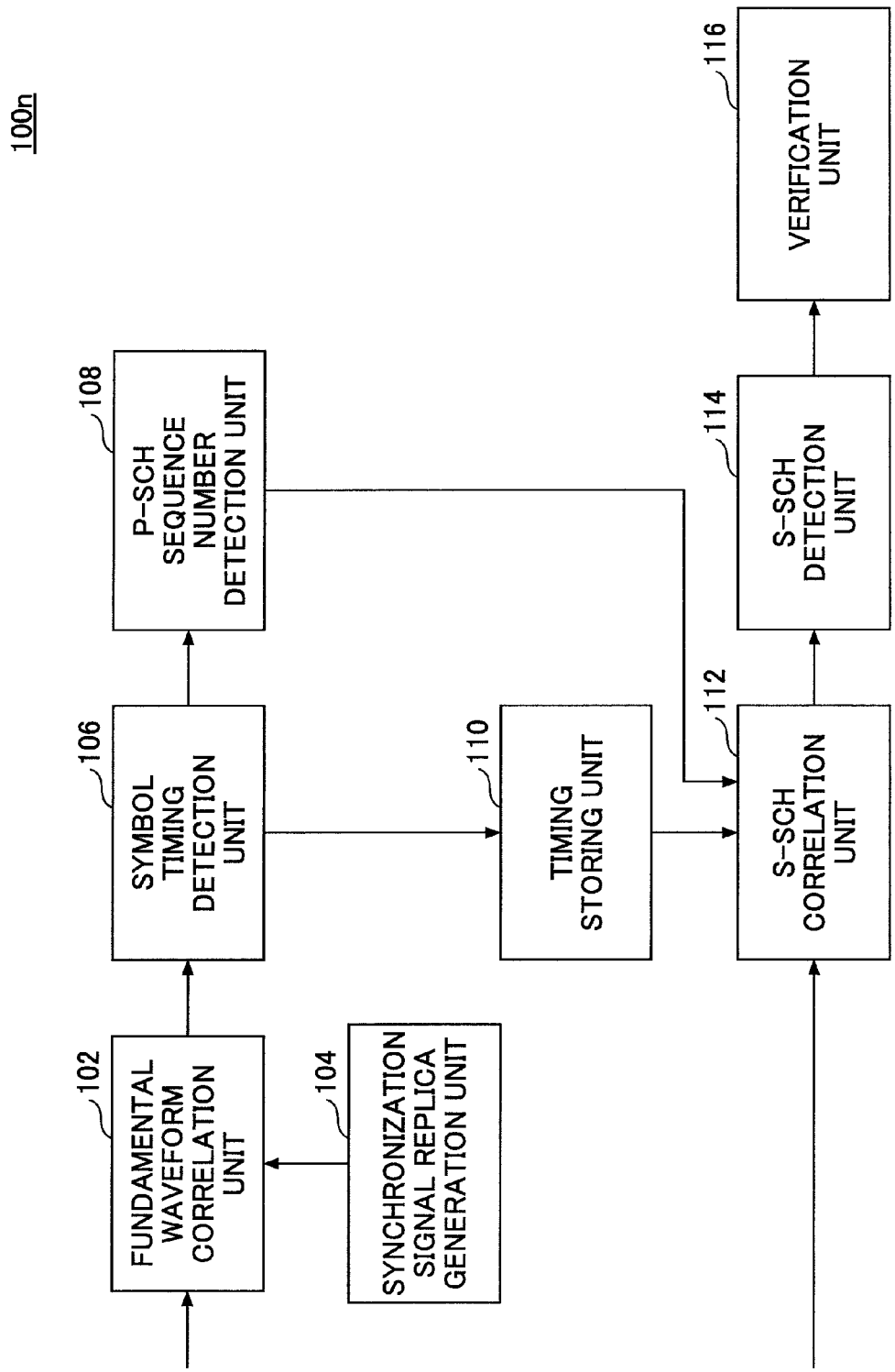
FIG. 13 is a partial block diagram illustrating a user apparatus according to an embodiment.

Next, the mobile station $100_n$ according to the present embodiment is described with reference to FIG. 13.

The mobile station $100_n$ includes a fundamental waveform correlation unit 102, a synchronization signal replica generation unit 104, a symbol timing detection unit 106, a P-SCH sequence number detection unit 108, a timing storing unit 110, a S-SCH correlation unit 112, a S-SCH detection unit 114 and a verification unit 116.

The mobile station $100_n$ supplies a multicarrier signal received at an antenna to the fundamental waveform correlation unit 102. On the other hand, the synchronization signal replica generation unit 104 generates a synchronization signal replica having a predefined fundamental waveform and supplies the generated synchronization signal replica to the fundamental waveform correlation unit 102 sequentially. For example, the synchronization signal replica generation unit 104 generates a synchronization signal replica including three different sequences and supplies the generated synchronization signal replica to the fundamental waveform correlation unit 102.

The fundamental waveform correlation unit 102 derives a correlation in a time domain between the received multicarrier signal and the synchronization signal replica including the three different sequences supplied from the synchronization signal replica generation unit 104. Then, the fundamental waveform correlation unit 102 supplies the correlation value between the received multicarrier signal and the synchronization signal replica and supplies the derived correlation value to the symbol timing detection unit 106.

The symbol timing detection unit 106 detects a SCH symbol timing and a P-SCH sequence number based on the correlation value supplied from the fundamental waveform correlation unit 102. For example, the symbol timing detection unit 106 may detect a symbol timing having the maximum correlation value. Then, the symbol timing detection unit 106 supplies the detected SCH symbol timing and P-SCH sequence number to the P-SCH sequence number detection unit 108 and the timing storing unit 110.

The P-SCH sequence number detection unit 108 detects a cell number of a residing cell of the mobile station $100_n$ based on the input P-SCH sequence number from the symbol timing detection unit 106. Then, the P-SCH sequence number detection unit 108 supplies the detected cell number and the scramble sequence multiplied S-SCH sequence to the S-SCH correlation unit 112.

The timing storing unit 110 stores the SCH symbol timing and the P-SCH sequence number supplied from the symbol timing detection unit 106.

The S-SCH correlation unit 112 derives a correlation between the scramble sequence multiplied S-SCH sequence supplied from the P-SCH sequence number detection unit 108 and the cell ID group. For example, the S-SCH correlation unit 112 uses the SCH symbol timing stored in the timing storing unit 110 to extract subcarrier components by performing a FFT operation on the S-SCH sequence. Then, the S-SCH correlation unit 112 detects a cell ID group and a radio frame timing from the S-SCH sequence. Cells within the same base station belong to the same cell ID group. In the case where a P-SCH specific scramble sequence is multiplied with the S-SCH sequence, the cell numbers within the same base station become known through detection of the P-SCH sequence. For example, the S-SCH correlation unit 112 finds a correlation in the frequency axis direction between the scramble sequence multiplied S-SCH sequence and the cell ID group.

In the case of neighboring cell search, when detecting the S-SCH sequence, correlation detection is performed assuming that the radio frame timing of the cell in communication is the same as the radio frame timing of the target (neighboring) cell. In this case, since it is not necessary to perform detection of the radio frame timing of the target cell, detection of radio frame timing is not included in detection of the S-SCH sequence. Accordingly, time required for detection of radio frame timing, and cell search time can be reduced.

The S-SCH detection unit 114 detects the S-SCH based on a correlation detection result of the S-SCH correlation unit 112. For example, the S-SCH detection unit 114 detects the S-SCH corresponding to the maximum correlation value based on the correlation detection result of the S-SCH correlation unit 112. For example, the S-SCH detection unit 114 detects the S-SCH among multiple S-SCH sequences determined based on the cell ID group and the radio frame timing. Specifically, in the case where the cell numbers within the same base station, which become known as a result of detection of the P-SCH sequence, are known (when performing initial cell search, for example), and, in the case where there are 168 types of cell ID groups and two types of radio frame timings, the S-SCH is detected among 336 (=168×2) types of S-SCHs.

Also, in the case where the cell numbers within the same base station, which become known as a result of detection of the P-SCH sequence, are not taken into account (when performing neighboring cell search, for example), for example, the S-SCH detection unit 114 may detect the S-SCH among multiple S-SCH sequences determined based on the cell ID group, the radio frame timing and the P-SCH specific scramble. Specifically, if there are 168 types of cell ID groups, two types of radio frame timing and three types of P-SCH specific scrambles, the S-SCH is detected among 1008 (=168×2×3) types of S-SCHs. In addition, the S-SCH may be detected among multiple S-SCH sequences determined based on a second short code scramble sequence specific to the first short code. In this case, if there are multiple S-SCH sequences determined based on the second short code scramble sequence specific to X types of first short codes (X is an arbitrary integer between 2 and 31), the S-SCH is detected among (168×2×3×X=1008×X) types of S-SCHs.

Upon detection of the P-SCH and the S-SCH sequence, the mobile station $100_n$ detects the cell ID group.

The verification unit 116 determines whether the detected cell specific information such as the cell ID and the radio frame timing is correct. If the verification is not performed correctly, detection miss or erroneous detection may occur.

It is described in detail below.

The cell search is performed based on the P-SCH and the S-SCH in a downlink signal. The cell search is performed based on the P-SCH sequence and the S-SCH sequence defined in the radio communication system 1000 as stated above. Specifically, the P-SCH sequence and the S-SCH sequence are detected to detect the cell ID or the cell ID group. After detection of the cell ID, a scramble code associated with the cell ID is used to receive broadcast information such as a physical broadcast channel, and the cell search may be ended. Details of the P-SCH sequence and the synchronization signal transmission pattern defined in the radio communication system 1000 are not repeatedly described as the description is the same as those for the base station apparatus $200_m$.

For example, if the radio communication system 1000 defines the synchronization signal transmission pattern described with reference to FIG. 8 and the P-SCH sequence number is associated with the cell ID information beforehand, the symbol timing detection unit 106 detects the synchronization channel timing and the P-SCH sequence number. Then, the detected synchronization channel timing is stored in the timing storing unit 110. Also, the S-SCH detection unit 114 performs descrambling with the S-SCH sequence multiplied scramble sequence to detect an information element in the S-SCH, whereby the cell specific information can be detected.

<Transmission and Reception of Synchronization Channel>

Next, a synchronization channel transmission method according to the present embodiment is described.

The S-SCH generation unit 254 selects multiple synchronization signal sequences. For example, the S-SCH generation unit 254 selects two types of sequences, a sequence of sequence length 32 including 16 short codes (first layer cell ID group indicator #1) and a sequence of sequence length 32 including 16 short codes (second layer cell ID group indicator #2). Then, the S-SCH generation unit 254 may generate prior information to be transmitted to a mobile station beforehand. For example, the S-SCH generation unit 254 may generate the prior information indicative of the first layer cell ID group as a portion of cell ID group identification information. If the prior information is generated, the prior information is transmitted.

Also, the S-SCH generation unit 254 generates a secondary synchronization channel based on selected multiple synchronization signal sequences. For example, the S-SCH generation unit 254 generates the secondary synchronization channel indicative of a secondary layer cell. ID group as a portion of the cell ID group identification information together with the first layer cell ID group as a portion of the cell ID group identification information. The synchronization signal control unit $209_1$ supplies information indicative of a scramble sequence to the scramble sequence generation unit 258. For example, the synchronization signal control unit $209_1$ supplies information indicative of a common scramble code over all cells to the scramble sequence generation unit 258. Also, for example, the synchronization control unit $209_1$ supplies information indicative of multiple types of scramble codes to the scramble sequence generation unit 258. The secondary synchronization channel is supplied to the multiplier 256, in the multiplier 256, the secondary synchronization channel is multiplied with the scramble sequence generated in the scramble sequence generation unit 258, and the multiplied sequence is transmitted.

The mobile station detects the cell specific information based on the prior information and the secondary synchronization channel.

<Operation of Mobile Station>

Figure 14:
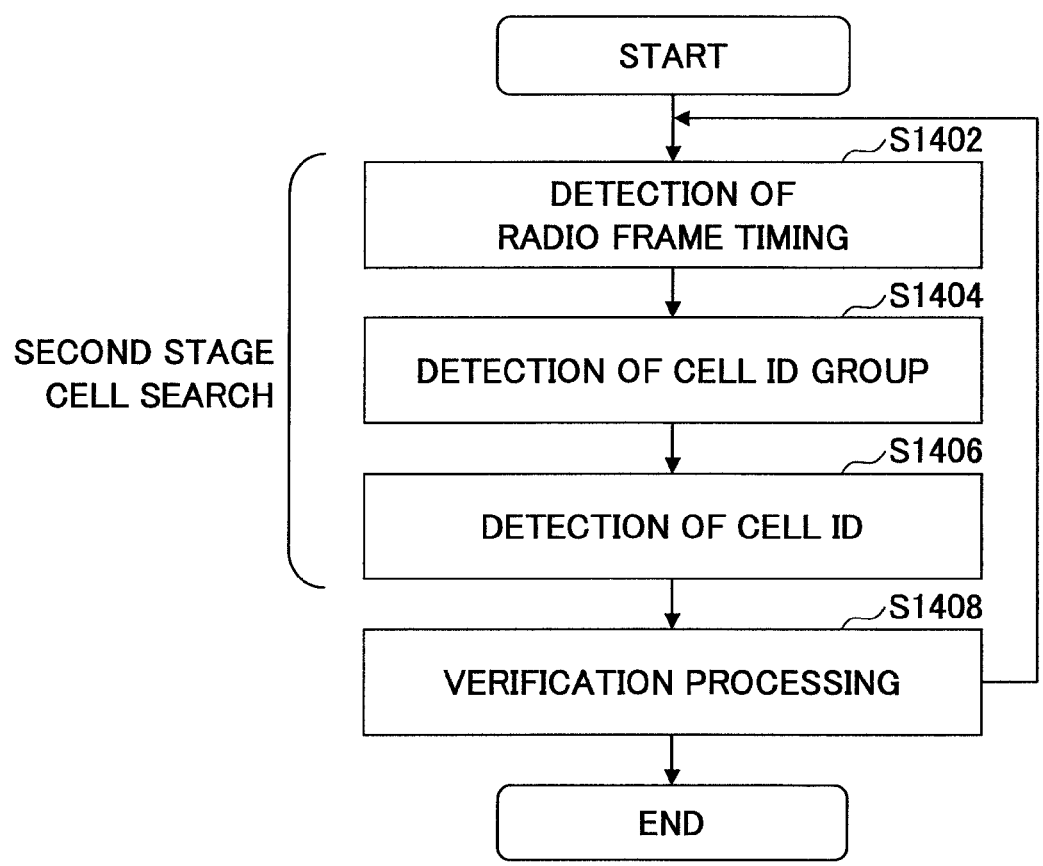
FIG. 14 is a flow diagram illustrating operation of the user apparatus according to an embodiment.

Next, a cell search method in the radio communication system 1000 according to the present embodiment is described with reference to FIG. 14.

The mobile station $100_n$ performs cell search from the second stage cell search.

The mobile station $100_n$ performs FFT processing on the S-SCH using the SCH symbol timing stored in the timing storing unit 110 to extract each subcarrier component. Then, the S-SCH detection unit 114 detects a radio frame timing and a cell ID from the S-SCH sequence (step S1402, step S1404). If the symbol timing and the carrier frequency of the P-SCH are known, reception timing and the carrier frequency of the S-SCH can be also known. Descramble is performed on the S-SCH multiplied by the scramble sequence. The radio frame timing is detected from the cell specific S-SCH sequence used in the S-SCH. Typically, since multiple (two, for example) SCHs are placed in one radio frame, it is necessary to detect the frame timing after detection of timing. Also, the cell ID group is detected from the cell-specific S-SCH sequence.

The mobile station 100, detects the cell ID using the cell ID group detected in step S1404 and the primary synchronization sequence number detected in the first step (step S1406).

The mobile station 100, performs verification processing (step S1408).

In the present embodiment, in the case when the SCH symbol timing is detected under an environment where inter-cell synchronization operation, the first stage cell search is not performed when performing search (neighbor cell search) of cell other than the cell in communication, so that cell search time can be reduced. More specifically, detection processing of the S-SCH is performed using the already detected SCH symbol timing.

As mentioned above, the mobile station $100_n$ performs the second stage cell search without performing the first stage cell search. For example, the S-SCH correlation unit 112 extracts each subcarrier component by performing FFT processing on the S-SCH sequence using symbol timing of SCH corresponding to the synchronization signal transmitted from the base station 200 that is being connected. More specifically, as the symbol timing of SCH, symbol timing stored in the timing storing unit 110 may be used. The SCH symbol timing may be one detected by the mobile station $100_n$ in initial cell search. In addition, the SCH symbol timing may be reported one.

In this case, the number of S-SCH sequences to be detected may become larger than that of the case where the second stage is performed after the first stage cell search. More particularly, the S-SCH sequence to be detected may include scramble sequences corresponding to three types of P-SCH sequence numbers. For example, the number of the S-SCH sequences to be detected may become greater by (the number of scramble sequences corresponding to three types of P-SCH sequence numbers)−1. In addition, the S-SCH sequence to be detected may include the second short code scramble sequence corresponding to first short code number. For example, the number of the S-SCH sequences to be detected may become greater by (the number of second short code scramble sequences corresponding to the first short code numbers)−1.

In addition, the mobile station $100_n$ may know or may not know information about whether adjacent cell uses inter-cell synchronization operation or asynchronous operation. For example, in the case when the mobile station $100_n$ does not know information about whether adjacent cell uses inter-cell synchronization operation or asynchronous operation, the mobile station $100_n$ may perform cell search from the second stage cell search, then, if the S-SCH sequence cannot be detected, the mobile station 100, may perform cell search from the first stage cell search. In addition, for example, in the case when the mobile station $100_n$ knows information about whether adjacent cell uses inter-cell synchronization operation or asynchronous operation, the information may be reported from a connected cell and/or a cell other than the connected cell. In this case, the mobile station $100_n$ may perform the second stage cell search using the reported timing information of the adjacent cell.

In addition, the mobile station $100_n$ may perform the second stage cell search for a predetermined time before or after the timing of the communicating cell or adjacent cell. More specifically, the mobile station $100_n$ may perform the second stage cell search for predetermined X samples before or after the timing of the communicating cell or adjacent cell. Even when the synchronization channel is transmitted from each cell at the same timing, there is a case where reception timing of the synchronization channel at the mobile station $100_n$ is shifted due to propagation routes. By configuring the system like the present embodiment, effects of the shift can be reduced.

In addition, the mobile station $100_n$ may perform the second stage cell search after applying the first stage cell search for a predetermined time before or after the timing of the communicating cell or the adjacent cell. The predetermined time before or after the timing of the communicating cell or the adjacent cell includes predetermined X samples before or after the timing of the communicating cell or the adjacent cell. By configuring the system like the present embodiment, accuracy of SCH symbol timing can be improved.

According to the present embodiment, the mobile station $100_n$ detects the correlation of the secondary synchronization channel included in the synchronization signal transmitted from a base station other than the connected base station by using timing information of the synchronization signal transmitted from the connecting base station. Accordingly, time required for cell search can be reduced.

According to the present embodiment, the connecting base station is synchronized with base stations other than the connecting base station. Accordingly, the synchronization channel is transmitted from the connected base station and from base stations other than the connected base station at the same timing. Thus, the mobile station $100_n$ can detect correlation of the secondary synchronization channel included in the synchronization signal transmitted from a base station other than the connected base station by using timing information corresponding to the synchronization signal transmitted from the connecting base station.

According to the present embodiment, timing information may include timing corresponding to the synchronization signal transmitted from the connected base station and predetermined timing around the timing. Accordingly, when the timing for receiving the synchronization channel at the mobile station $100_n$ is shifted due to the effect of propagation routes, effect of the shift can be reduced.

According to the present embodiment, the secondary synchronization channel correlation detection unit performs Fourier transform processing on the secondary synchronization channel included in the synchronization channel to extract each subcarrier component and to detect a correlation between each subcarrier component and secondary synchronization channel sequences by using the timing information. By configuring the unit like that, in the case where the S-SCH sequence is multiplied by the P-SCH specific scramble sequence, the S-SCH sequence can be detected even when the P-SCH sequence cannot be detected by starting cell search from the second stage cell search.

According to the present embodiment, multiple secondary synchronization channel sequences may include sequences corresponding to the primary synchronization channel sequence. Accordingly, in the case where the S-SCH sequence is multiplied by the P-SCH specific scramble sequence, the S-SCH sequence can be detected even when the P-SCH sequence cannot be detected by starting cell search from the second stage cell search.

According to the present embodiment, a determination unit configured to determine that the secondary synchronization channel detected by the secondary synchronization channel detection unit is correct is provided. Accordingly, it becomes possible to determine whether the detection result is correct.

According to the present embodiment, when the connected base station is synchronized with the other base station other than the connected base station, the secondary synchronization channel correlation detection unit may detect the correlation of the secondary synchronization channel included in the synchronization signal transmitted by the other base station other than the connected base station based on timing information corresponding to the synchronization signal transmitted from the connected base station. For example, when it is detected that the timing storing unit 110 stores the timing information, the secondary synchronization channel correlation detection unit may detect the correlation of the secondary synchronization channel included in the synchronization signal transmitted by the other base station other than the connected base station based on the stored timing information. Accordingly, detection error in the second stage cell search can be reduced.

According to the present embodiment, when timing information of the synchronization signal transmitted from the other base station other than the connected base station is reported, the secondary synchronization channel correlation detection unit may detect the correlation of the secondary synchronization channel included in the synchronization signal transmitted from the other base station other than the connected base station based on the reported timing information. The timing information may be reported from the connected base station, also may be reported from a base station other than the connected base station. Accordingly, when timing information is reported, time required for cell search can be reduced.

According to the present embodiment, the user apparatus includes a frame timing detection unit configured to detect a frame timing of the synchronization signal transmitted from the other base station other than the connected base station based on timing information corresponding to the synchronization signal transmitted from the connected base station, and the secondary synchronization channel correlation detection unit detects the correlation of the secondary synchronization channel included in the synchronization signal transmitted by the other base station other than the connected base station based on the frame timing corresponding to the synchronization signal detected by the frame timing detection unit. Accordingly, accuracy of the timing information can be improved.

According to the present embodiment, the frame timing detection unit detects the frame timing of the synchronization signal transmitted by the other base station other than the connected base station based on a timing including a predetermined timing before or after the timing of the synchronization signal transmitted by the connected base station. Accordingly, when the timing for receiving the synchronization channel at the mobile station $100_n$ is shifted due to the effect of propagation routes, effect of the shift can be reduced.

Although the Evolved UTRA and UTRAN (also referred to as Long Term Evolution or Super 3G) applied system has been illustratively described in the above embodiments, the user apparatus and the cell search method according to the present invention can be applied to all systems using the OFDM scheme in downlink. Also, the user apparatus and the cell search method can be applied to a radio communication system where the synchronization channel including the primary synchronization channel and the secondary synchronization channel is utilized. For example, the user apparatus and the cell search method can be applied to a future mobile communication system such as the IMT-Advanced. The IMT-Advanced is also referred to as LTE-Advanced in 3GPP ($3^{rd}$ Generation Partnership Project).

For convenience, the present invention has been described using specific numerals in order to facilitate understandings of the present invention, but unless specifically stated otherwise, these numerals are simply illustrative, and any other appropriate value may be used.

Although the present invention has been described with reference to specific embodiments, these embodiments are simply illustrative, and various variations, modifications, alterations, substitutions and so on could be conceived by those skilled in the art. For convenience, apparatuses according to the embodiments of the present invention have been described with reference to functional block diagrams, but the apparatuses may be implemented in hardware, software or combinations thereof. The present invention is not limited to the above-mentioned embodiment and is intended to include various variations, modifications, alterations, substitutions and so on without departing from the spirit of the present invention.

The present international application claims priority based on Japanese patent application No. 2008-207485, filed in the JPO on Aug. 11, 2008, and the entire contents of the Japanese patent application No. 2008-207485 is incorporated herein by reference.

LIST OF REFERENCE SYMBOLS $50_k$ ($50_1$, $50_2$, $50_3$): cell
$100_n$ ($100_1$, $100_2$, $100_3$, $100_4$, $100_5$): user apparatus
102: fundamental waveform correlation unit
104: synchronization signal replica generation unit
106: symbol timing detection unit
108: P-SCH sequence number detection unit
110: symbol timing storing unit
112: S-SCH correlation unit
114: S-SCH detection unit
116: verification unit
$200_m$ ($200_1$, $200_2$, $200_3$): base station apparatus
202: transmit and receive antenna
204: amplification unit
206: transmitting and receiving unit
208: baseband signal processing unit
209: synchronization signal generation unit
210: call processing unit
212: transmission route interface
$208_1$: RLC processing unit
$208_2$: MAC processing unit
$208_3$: encoding unit
$208_4$: data modulation unit
$208_5$: multiplexing unit
$208_6$: serial to parallel conversion unit
$208_7$: multipliers
$208_8$: multipliers
$208_9$: scramble code generation unit
$208_{10}$: amplitude adjustment unit
$208_{11}$: combination unit
$208_{12}$: inverse Fourier transform unit
$208_{13}$: CP addition unit
$209_1$: synchronization signal control unit
$209_2$: synchronization signal generation unit
$209_3$: data modulation unit
$209_4$: serial to parallel conversion unit
$209_5$: multipliers
$209_6$: amplitude adjustment unit
252: P-SCH generation unit
254: S-SCH generation unit
256: multipliers
258: scramble code sequence generation unit
260: multiplexing unit
300: access gateway apparatus
400: core network
1000: radio communication system

The invention claimed is:

1. A user apparatus for performing cell search, comprising:
a timing information detection unit configured to detect timing information of a synchronization signal transmitted from a connected base station;
a secondary synchronization channel correlation detection unit configured to detect a correlation of a secondary synchronization channel included in a synchronization signal transmitted by another base station other than the connected base station by using the timing information detected by the timing information detection unit; and
a secondary synchronization channel detection unit configured to detect the secondary synchronization channel based on a result of the correlation detection by the secondary synchronization channel correlation detection unit.

2. The user apparatus as claimed in claim 1, wherein the secondary synchronization channel correlation detection unit detects the correlation of the secondary synchronization channel included in the synchronization signal transmitted from the other base station that is synchronized with the connected base station.

3. The user apparatus as claimed in claim 1, wherein the secondary synchronization channel correlation detection unit detects the correlation of the secondary synchronization channel included in the synchronization signal transmitted from the other base station other than the connected base station based on a symbol timing, included in the timing information, of the synchronization signal transmitted from the connected base station and a predetermined timing before or after the symbol timing.

4. The user apparatus as claimed in claim 1, wherein the secondary synchronization channel correlation detection unit performs Fourier transform processing on the secondary synchronization channel included in the synchronization signal to detect a correlation between a subcarrier component and a secondary synchronization channel sequence by using the timing information.

5. The user apparatus as claimed in claim 4, wherein the secondary synchronization channel correlation detection unit detects a correlation with multiple secondary synchronization channels including sequences corresponding to a primary synchronization channel.

6. The user apparatus as claimed in claim 1, comprising:
a determination unit configured to determine that the secondary synchronization channel detected by the secondary synchronization channel detection unit is correct.

7. The user apparatus as claimed in claim 1, wherein, when the connected base station is synchronized with the other base station other than the connected base station, the secondary synchronization channel correlation detection unit detects the correlation of the secondary synchronization channel included in the synchronization signal transmitted by the other base station other than the connected base station based on timing information of the synchronization signal transmitted from the connected base station.

8. The user apparatus as claimed in claim 1, wherein, when timing information of the synchronization signal transmitted from the other base station other than the connected base station is reported, the secondary synchronization channel correlation detection unit detects the correlation of the secondary synchronization channel included in the synchronization signal transmitted from the other base station other than the connected base station based on the reported timing information.

9. The user apparatus as claimed in claim 1, comprising:
a frame timing detection unit configured to detect a frame timing of the synchronization signal transmitted from the other base station other than the connected base station by using the timing information detected by the timing information detection unit,
wherein the secondary synchronization channel correlation detection unit detects the correlation of the secondary synchronization channel included in the synchronization signal transmitted by the other base station other than the connected base station based on the frame timing of the synchronization signal detected by the frame timing detection unit.

10. The user apparatus as claimed in claim 9, wherein the frame timing detection unit detects the frame timing of the synchronization signal transmitted by the other base station other than the connected base station based on a timing including a predetermined timing before or after a frame timing of the synchronization signal transmitted by the connected base station.

11. A cell search method in a user apparatus for performing cell search, comprising:
a timing information detection step of detecting timing infoll tation of a synchronization signal transmitted from a connected base station;
a secondary synchronization channel correlation detection step of detecting a correlation of a secondary synchronization channel included in a synchronization signal transmitted from another base station other than the connected base station by using the timing information detected in the timing information detection step; and
a secondary synchronization channel detection step of detecting the secondary synchronization channel based on a result of the correlation detection in the secondary synchronization channel correlation detection step.

* * * * *